United States Patent
Shuai et al.

(10) Patent No.: US 12,218,706 B2
(45) Date of Patent: Feb. 4, 2025

(54) SIGNAL GENERATING METHOD, APPARATUS, AND SYSTEM

(71) Applicant: HUAWEI TECHNOLOGIES CO., LTD., Guangdong (CN)

(72) Inventors: Songlin Shuai, Chengdu (CN); Xianbin Yu, Hangzhou (CN); Zijie Lu, Hangzhou (CN); Hua Cai, Chengdu (CN); Guangjian Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 230 days.

(21) Appl. No.: 18/063,364

(22) Filed: Dec. 8, 2022

(65) Prior Publication Data

US 2023/0102549 A1  Mar. 30, 2023

Related U.S. Application Data

(63) Continuation of application No. PCT/CN2021/097952, filed on Jun. 2, 2021.

(30) Foreign Application Priority Data

Jun. 9, 2020  (CN) .......................... 202010518631.8

(51) Int. Cl.
*H04B 10/516* (2013.01)
*H04B 10/50* (2013.01)

(52) U.S. Cl.
CPC ......... *H04B 10/516* (2013.01); *H04B 10/503* (2013.01)

(58) Field of Classification Search
CPC ................ H04B 10/516; H04B 10/548; H04B 10/572
See application file for complete search history.

(56) References Cited

U.S. PATENT DOCUMENTS

| | | | | |
|---|---|---|---|---|
| 2005/0018724 A1* | 1/2005 | Da Silva | ............... | H01S 5/4006 372/32 |
| 2009/0284828 A1* | 11/2009 | Sosabowski | .......... | H01S 3/1115 372/18 |
| 2015/0241271 A1* | 8/2015 | Kuo | .......................... | G01J 9/04 250/201.1 |

FOREIGN PATENT DOCUMENTS

| CN | 102255222 A | 11/2011 |
|---|---|---|
| CN | 102244335 B | 5/2013 |

(Continued)

OTHER PUBLICATIONS

P. J. Delfyett, I. Ozdur, N. Hoghooghi, M. Akbulut, J. Davila-Rodriguez and S. Bhooplapur, "Advanced Ultrafast Technologies Based on Optical Frequency Combs," in IEEE Journal of Selected Topics in Quantum Electronics, vol. 18, No. 1, pp. 258-274, Jan.-Feb. 2012, doi: 10.1109/JSTQE.2011.2114874. (Year: 2012).*

(Continued)

*Primary Examiner* — Nathan M Cors
(74) *Attorney, Agent, or Firm* — Fish & Richardson P.C.

(57) ABSTRACT

This application discloses a signal generating method, apparatus, and system. One example method includes: performing cyclic electro-optic modulation on a first signal to generate a first optical frequency comb signal, where the first signal is a signal output by a laser source, the first optical frequency comb signal includes a target spectral component, and a frequency of the target spectral component is equal to a sum of or a difference between a frequency of the first signal and a frequency of a target signal; performing first filtering processing on the first optical frequency comb signal to generate the target spectral component; and generating the target signal based on a heterodyne beat frequency of the first signal and the target spectral component.

20 Claims, 6 Drawing Sheets

(56) References Cited

FOREIGN PATENT DOCUMENTS

| CN | 103684611 A | | 3/2014 | |
|---|---|---|---|---|
| CN | 105006736 A | | 10/2015 | |
| GB | 2250394 A | * | 6/1992 | ............. H04B 10/50 |

OTHER PUBLICATIONS

Ishizawa et al., "Ultralow-phase-noise millimetre-wave signal generator assisted with an electro-optics-modulator-based optical frequency comb," Scientific Reports, May 17, 2016, 7 pages.
Shen et al., "Millimetre wave generation using an optical comb generator with optical phase-locked loops," International Topical Meeting on Microwave Photonics, Oct. 31, 2002, 4 pages.
Extended European Search Report in European ApplN No. 21820976.5, dated Oct. 9, 2023, 10 pages.

* cited by examiner

SIGNAL GENERATING METHOD, APPARATUS, AND SYSTEM

CROSS-REFERENCE TO RELATED APPLICATIONS

This application is a continuation of International Application No. PCT/CN2021/097952, filed on Jun. 2, 2021, which claims priority to Chinese Patent Application No. 202010518631.8, filed on Jun. 9, 2020. The disclosures of the aforementioned applications are hereby incorporated by reference in their entireties.

TECHNICAL FIELD

This application relates to the field of communication technologies, and in particular, to a signal generating method, apparatus, and system.

BACKGROUND

For an increasingly improving broadband wireless connection requirement, a millimeter wave and a terahertz wave gradually become hotspots in wireless communication research. For example, a technology of generating a millimeter wave or a terahertz wave is a hotspot in the wireless communication research.

A conventional technology of generating a millimeter wave or a terahertz wave is a signal generating technology based on an electrical method. In this technology, a system has relatively high complexity and costs. In comparison, in a signal generating technology based on an optical heterodyning method, the system has a simple structure and relatively low costs. In addition, generated signals have a relatively large frequency range. However, in the optical heterodyning method, a laser outputting an optical wave signal is easily affected by a temperature drift factor. As a result, a frequency of a generated millimeter wave signal or a generated terahertz wave signal is unstable, and is prone to random fluctuation. In the conventional technologies, a plurality of technologies of improving an optical heterodyning method are proposed. However, it is not possible to generate a terahertz signal with a relatively high frequency. On this basis, how to generate a high-frequency terahertz wave signal becomes an urgent technical problem to be resolved.

SUMMARY

This application provides a signal generating method, apparatus, and system, to resolve a problem of generating a high-frequency terahertz wave signal.

According to a first aspect, this application provides a signal generating method. The method includes: performing cyclic electro-optic modulation on a first signal to generate a first optical frequency comb signal, where the first signal is a signal output by a laser source, the first optical frequency comb signal includes a target spectral component, and a frequency of the target spectral component is equal to a sum of or a difference between a frequency of the first signal and a frequency of a target signal; performing first filtering processing on the first optical frequency comb signal to generate the target spectral component; and generating the target signal based on a heterodyne beat frequency of the first signal and the target spectral component.

In this implementation, cyclic electro-optic modulation is performed on the first signal output by the laser source to obtain the first optical frequency comb signal. The first optical frequency comb signal includes the target spectral component whose frequency is equal to the sum of or the difference between the frequency of the first signal and the frequency of the target signal. Then, after filtering is performed on the first optical frequency comb signal, the target spectral component is obtained. Finally, the target signal is obtained based on the heterodyne beat frequency of the first signal and the target spectral component. Cyclic electro-optic modulation is performed on the first signal. The first optical frequency comb signal including the target spectral component with relatively high power may be obtained. Further, the target spectral component with the relatively high power may be obtained through filtering. A terahertz wave signal with a relatively high frequency may be obtained based on the heterodyne beat frequency of the first signal and the target spectral component.

With reference to the first aspect, in a possible implementation, the performing cyclic electro-optic modulation on a first signal includes: performing electro-optic modulation on the first signal and an output signal in an $N^{th}$ time of electro-optic modulation to generate an output signal in an $(N+1)^{th}$ time of electro-optic modulation, where N is an integer greater than or equal to 0.

In this implementation, electro-optic modulation is performed on the first signal and the output signal in the $N^{th}$ time of electro-optic modulation to generate the output signal in the $(N+1)^{th}$ time of electro-optic modulation. Cyclic electro-optic modulation is implemented for the first signal to obtain the optical frequency comb signal with a relatively large bandwidth, relatively uniform power distribution, and a relatively high edge sideband signal-to-noise ratio. Subsequently, the target spectral component with relatively high power that can be used to generate a terahertz wave signal with a relatively high frequency based on a beat frequency may be obtained based on the optical frequency comb signal.

With reference to the first aspect, in a possible implementation, the performing electro-optic modulation on the first signal and an output signal in an $N^{th}$ time of electro-optic modulation to generate an output signal in an $(N+1)^{th}$ time of electro-optic modulation includes: performing single sideband electro-optic modulation on the first signal and the output signal in the $N^{th}$ time of electro-optic modulation to generate the output signal in the $(N+1)^{th}$ time of electro-optic modulation.

In this implementation, cyclic electro-optic modulation is performed on the first signal in a single sideband electro-optic modulation manner, so that the subsequently obtained first optical frequency comb signal is a single sideband optical frequency comb signal. The single sideband optical frequency comb signal has a relatively large bandwidth, relatively uniform power distribution, and a relatively high edge sideband signal-to-noise ratio; and may include the target spectral component with the relatively high power. Subsequently, the target spectral component is used for the heterodyne beat frequency, to generate the target signal with the relatively high frequency.

With reference to the first aspect, in a possible implementation, the performing electro-optic modulation on the first signal and an output signal in an $N^{th}$ time of electro-optic modulation to generate an output signal in an $(N+1)^{th}$ time of electro-optic modulation includes: performing double sideband electro-optic modulation on the first signal and the output signal in the $N^{th}$ time of electro-optic modulation to generate an $(N+1)^{th}$ double sideband modulation signal; and performing second filtering processing on the $(N+1)^{th}$ double sideband modulation signal to generate the output signal in the $(N+1)^{th}$ time of electro-optic modulation.

In this implementation, first, double sideband electro-optic modulation is performed on the first signal and the output signal in the $N^{th}$ time of electro-optic modulation to obtain the double sideband optical frequency comb signal. Then, filtering processing is performed on the double sideband optical frequency comb signal to obtain a single sideband optical frequency comb signal, so that the subsequently generated first optical frequency comb signal is a single sideband optical frequency comb signal. The single sideband optical frequency comb signal has a relatively large bandwidth, relatively uniform power distribution, and a relatively high edge sideband signal-to-noise ratio; and may include the target spectral component with the relatively high power. Subsequently, the target spectral component is used for the heterodyne beat frequency, to generate the target signal with the relatively high frequency.

With reference to the first aspect, in a possible implementation, the performing electro-optic modulation on the first signal and an output signal in an $N^{th}$ time of electro-optic modulation to generate an output signal in an $(N+1)^{th}$ time of electro-optic modulation includes: performing double sideband electro-optic modulation on the first signal and the output signal in the $N^{th}$ time of electro-optic modulation to generate the output signal in the $(N+1)^{th}$ time of electro-optic modulation.

In this implementation, cyclic electro-optic modulation is performed on the first signal in a double sideband electro-optic modulation manner. The subsequently generated first optical frequency comb signal is a double sideband optical frequency comb signal. The double sideband optical frequency comb signal includes more sideband orders and a wider frequency comb. The target signal generated based on the double sideband optical frequency comb signal has wider frequency distribution.

With reference to the first aspect, in a possible implementation, the method further includes: calibrating a frequency and a phase of an output signal of the laser source.

In this implementation, the frequency and the phase of the output signal of the laser source may be calibrated, to achieve a purpose of stabilizing the target signal and obtain the stable target signal.

With reference to the first aspect, in a possible implementation, the calibrating a frequency and a phase of an output signal of the laser source includes: calibrating the frequency and the phase of the output signal of the laser source based on the output signal in the $(N+1)^{th}$ time of electro-optic modulation, the first signal, and a preset tracked signal.

In this implementation, the frequency and the phase of the output signal of the laser source are calibrated based on the output signal in the $(N+1)^{th}$ time of electro-optic modulation. In other words, each time after the output signal in the electro-optic modulation is obtained, the frequency and the phase of the output signal of the laser source are calibrated in time based on the output signal, so that the subsequently generated target signal is more stable.

With reference to the first aspect, in a possible implementation, the calibrating the frequency and the phase of the output signal of the laser source based on the output signal in the $(N+1)^{th}$ time of electro-optic modulation, the first signal, and a preset tracked signal includes: performing third filtering processing on the output signal in the $(N+1)^{th}$ time of electro-optic modulation to generate an $(N+1)^{th}$ calibration spectral component, where a frequency of the $(N+1)^{th}$ calibration spectral component is different from the frequency of the first signal; generating an $(N+1)^{th}$ error signal based on the preset tracked signal and a signal generated based on a heterodyne beat frequency of the first signal and the $(N+1)^{th}$ calibration spectral component; and calibrating the frequency and the phase of the output signal of the laser source based on the $(N+1)^{th}$ error signal.

In this implementation, a spectral component with a frequency different from the frequency of the first signal is obtained through filtering from the output signal in the $(N+1)^{th}$ time of electro-optic modulation. An error signal is obtained through frequency mixing and phase discrimination performed on the preset tracked signal and the signal generated based on the heterodyne beat frequency of the spectral component and the first signal. Subsequently, the frequency and the phase of the output signal of the laser source are calibrated by using the error signal, so that the frequency and the phase of the first signal output by the laser source reach a stable state, to achieve a purpose of stabilizing the target signal.

According to a second aspect, this application provides a signal generating apparatus. The apparatus includes: a cyclic modulation module, configured to perform cyclic electro-optic modulation on a first signal to generate a first optical frequency comb signal, where the first signal is a signal output by a laser source, the first optical frequency comb signal includes a target spectral component, and a frequency of the target spectral component is equal to a sum of or a difference between a frequency of the first signal and a frequency of a target signal; and a signal generating module, configured to: perform first filtering processing on the first optical frequency comb signal to generate the target spectral component, and generate the target signal based on a heterodyne beat frequency of the first signal and the target spectral component.

For the apparatus in this implementation, cyclic electro-optic modulation is performed on the first signal output by the laser source to obtain the first optical frequency comb signal. The first optical frequency comb signal includes the target spectral component whose frequency is equal to the sum of or the difference between the frequency of the first signal and the frequency of the target signal. Then, after filtering is performed on the first optical frequency comb signal, the target spectral component is obtained. Finally, the target signal is obtained based on the heterodyne beat frequency of the first signal and the target spectral component. In other words, the apparatus may perform cyclic electro-optic modulation on the first signal. The first optical frequency comb signal including the target spectral component with relatively high power may be obtained. Further, the target spectral component with the relatively high power may be obtained through filtering. A terahertz wave signal with a relatively high frequency may be obtained based on the heterodyne beat frequency of the first signal and the target spectral component.

With reference to the second aspect, in a possible implementation, the cyclic modulation module is specifically configured to: perform electro-optic modulation on the first signal and an output signal in an $N^{th}$ time of electro-optic modulation to generate an output signal in an $(N+1)^{th}$ time of electro-optic modulation, where N is an integer greater than or equal to 0.

For the apparatus in this implementation, electro-optic modulation is performed on the first signal and the output signal in the $N^{th}$ time of electro-optic modulation to generate the output signal in the $(N+1)^{th}$ time of electro-optic modulation. Cyclic electro-optic modulation is implemented for the first signal to obtain the optical frequency comb signal with a relatively large bandwidth, relatively uniform power distribution, and a relatively high edge sideband signal-to-noise ratio. Subsequently, the target spectral component with relatively high power that can be used to generate a terahertz wave signal with a relatively high frequency based on a beat frequency may be obtained based on the optical frequency comb signal.

With reference to the second aspect, in a possible implementation, the cyclic modulation module is specifically configured to: perform single sideband electro-optic modulation on the first signal and an output signal in an $N^{th}$ time of electro-optic modulation to generate an output signal in an $(N+1)^{th}$ time of electro-optic modulation.

The apparatus in this implementation performs cyclic electro-optic modulation on the first signal in a single sideband electro-optic modulation manner, so that the subsequently obtained first optical frequency comb signal is a single sideband optical frequency comb signal. The single sideband optical frequency comb signal has a relatively large bandwidth, relatively uniform power distribution, and a relatively high edge sideband signal-to-noise ratio; and may include the target spectral component with the relatively high power. Subsequently, the target spectral component is used for the heterodyne beat frequency, to generate the target signal with the relatively high frequency.

With reference to the second aspect, in a possible implementation, the cyclic modulation module is specifically configured to: perform double sideband electro-optic modulation on the first signal and the output signal in the $N^{th}$ time of electro-optic modulation to generate an $(N+1)^{th}$ double sideband modulation signal; and perform second filtering processing on the $(N+1)^{th}$ double sideband modulation signal to generate the output signal in the $(N+1)^{th}$ time of electro-optic modulation.

The apparatus in this implementation first performs double sideband electro-optic modulation on the first signal and the output signal in the $N^{th}$ time of electro-optic modulation to obtain the double sideband optical frequency comb signal, and then performs filtering processing on the double sideband optical frequency comb signal to obtain a single sideband optical frequency comb signal, so that the subsequently generated first optical frequency comb signal is a single sideband optical frequency comb signal. The single sideband optical frequency comb signal has a relatively large bandwidth, relatively uniform power distribution, and a relatively high edge sideband signal-to-noise ratio; and may include the target spectral component with the relatively high power. Subsequently, the target spectral component is used for the heterodyne beat frequency, to generate the target signal with the relatively high frequency.

With reference to the second aspect, in a possible implementation, the cyclic modulation module is specifically configured to: perform double sideband electro-optic modulation on the first signal and an output signal in an $N^{th}$ time of electro-optic modulation to generate an output signal in an $(N+1)^{th}$ time of electro-optic modulation.

The apparatus in this implementation performs cyclic electro-optic modulation on the first signal in a double sideband electro-optic modulation manner. The subsequently generated first optical frequency comb signal is a double sideband optical frequency comb signal. The double sideband optical frequency comb signal includes more sideband orders and a wider frequency comb. The target signal generated based on the double sideband optical frequency comb signal has wider frequency distribution.

With reference to the second aspect, in a possible implementation, the apparatus further includes a calibration module, configured to calibrate a frequency and a phase of an output signal of the laser source.

The apparatus in this implementation calibrates the frequency and the phase of the output signal of the laser source, to achieve a purpose of stabilizing the target signal and obtain the stable target signal.

With reference to the second aspect, in a possible implementation, the calibration module is specifically configured to: calibrate the frequency and the phase of the output signal of the laser source based on the output signal in the $(N+1)^{th}$ time of electro-optic modulation, the first signal, and a preset tracked signal.

The apparatus in this implementation calibrates the frequency and the phase of the output signal of the laser source based on the output signal in the $(N+1)^{th}$ time of electro-optic modulation. In other words, each time after the apparatus obtains the output signal in the electro-optic modulation, the apparatus calibrates the frequency and the phase of the output signal of the laser source in time based on the output signal, so that the subsequently generated target signal is more stable.

With reference to the second aspect, in a possible implementation, the calibration module is specifically configured to: perform third filtering processing on the output signal in the $(N+1)^{th}$ time of electro-optic modulation to generate an $(N+1)^{th}$ calibration spectral component, where a frequency of the $(N+1)^{th}$ calibration spectral component is different from a frequency of the first signal; generate an $(N+1)^{th}$ error signal based on the preset tracked signal and a signal generated based on a heterodyne beat frequency of the first signal and the $(N+1)^{th}$ calibration spectral component; and calibrate the frequency and the phase of the output signal of the laser source based on the $(N+1)^{th}$ error signal.

The apparatus in this implementation obtains, through filtering, a spectral component with a frequency different from the frequency of the first signal from the output signal in the $(N+1)^{th}$ time of electro-optic modulation; obtains an error signal through frequency mixing and phase discrimination performed on the preset tracked signal and the signal generated based on the heterodyne beat frequency of the spectral component and the first signal; and subsequently, calibrates the frequency and the phase of the output signal of the laser source by using the error signal, so that the frequency and the phase of the first signal output by the laser source reach a stable state, to achieve a purpose of stabilizing the target signal.

According to a third aspect, this application provides a signal generating system. The system includes a modulator, a filter, and a photoelectric detector. An input end of the modulator is connected to an output end of a laser source. An output end of the modulator is connected to an input end of the filter. The input end of the modulator is connected to the output end of the modulator. An output end of the filter is connected to an input end of the photoelectric detector. The modulator is configured to: receive a first signal output by the laser source, and perform cyclic electro-optic modulation on the first signal to generate a first optical frequency comb signal. The first optical frequency comb signal includes a target spectral component. A frequency of the target spectral component is equal to a sum of or a difference between a frequency of the first signal and a frequency of the target signal. The filter is configured to perform first filtering processing on the first optical frequency comb signal to generate the target spectral component. The photoelectric detector is configured to generate the target signal based on a heterodyne beat frequency of the first signal and the target spectral component.

For the system in this implementation, cyclic electro-optic modulation is performed on the first signal output by the laser source to obtain the first optical frequency comb signal. The first optical frequency comb signal includes the target spectral component whose frequency is equal to the sum of or the difference between the frequency of the first signal and the frequency of the target signal. Then, after filtering is performed on the first optical frequency comb signal, the target spectral component is obtained. Finally, the target signal is obtained based on the heterodyne beat frequency of the first signal and the target spectral component. In other words, the system may perform cyclic electro-optic modulation on the first signal. The first optical frequency comb signal including the target spectral component with relatively high power may be obtained. Further, the target spectral component with the relatively high power may be obtained through filtering. A terahertz wave signal with a relatively high frequency may be obtained based on the heterodyne beat frequency of the first signal and the target spectral component.

With reference to the third aspect, in a possible implementation, the modulator is specifically configured to: perform electro-optic modulation on the first signal and an output signal in an $N^{th}$ time of electro-optic modulation to generate an output signal in an $(N+1)^{th}$ time of electro-optic modulation, where N is an integer greater than or equal to 0.

For the system in this implementation, electro-optic modulation is performed on the first signal and the output signal in the $N^{th}$ time of electro-optic modulation to generate the output signal in the $(N+1)^{th}$ time of electro-optic modulation. Cyclic electro-optic modulation is implemented for the first signal to obtain the optical frequency comb signal with a relatively large bandwidth, relatively uniform power distribution, and a relatively high edge sideband signal-to-noise ratio. Subsequently, the target spectral component with relatively high power that can be used to generate a terahertz wave signal with a relatively high frequency based on a beat frequency may be obtained based on the optical frequency comb signal.

With reference to the third aspect, in a possible implementation, the modulator is specifically configured to: perform single sideband electro-optic modulation on the first signal and an output signal in an $N^{th}$ time of electro-optic modulation to generate an output signal in an $(N+1)^{th}$ time of electro-optic modulation.

For the system in this implementation, cyclic electro-optic modulation is performed on the first signal in a single sideband electro-optic modulation manner, so that the subsequently obtained first optical frequency comb signal is a single sideband optical frequency comb signal. The single sideband optical frequency comb signal has a relatively large bandwidth, relatively uniform power distribution, and a relatively high edge sideband signal-to-noise ratio; and may include the target spectral component with the relatively high power. Subsequently, the target spectral component is used for the heterodyne beat frequency, to generate the target signal with the relatively high frequency.

With reference to the third aspect, in a possible implementation, the modulator is specifically configured to: perform double sideband electro-optic modulation on the first signal and the output signal in the $N^{th}$ time of electro-optic modulation to generate an $(N+1)^{th}$ double sideband modulation signal; and perform second filtering processing on the $(N+1)^{th}$ double sideband modulation signal to generate the output signal in the $(N+1)^{th}$ time of electro-optic modulation.

For the system in this implementation, first, double sideband electro-optic modulation is performed on the first signal and the output signal in the $N^{th}$ time of electro-optic modulation to obtain the double sideband optical frequency comb signal. Then, filtering processing is performed on the double sideband optical frequency comb signal to obtain a single sideband optical frequency comb signal, so that the subsequently generated first optical frequency comb signal is a single sideband optical frequency comb signal. The single sideband optical frequency comb signal has a relatively large bandwidth, relatively uniform power distribution, and a relatively high edge sideband signal-to-noise ratio; and may include the target spectral component with the relatively high power. Subsequently, the target spectral component is used for the heterodyne beat frequency, to generate the target signal with the relatively high frequency.

With reference to the third aspect, in a possible implementation, the modulator is specifically configured to: perform double sideband electro-optic modulation on the first signal and an output signal in an $N^{th}$ time of electro-optic modulation to generate an output signal in an $(N+1)^{th}$ time of electro-optic modulation.

For the system in this implementation, cyclic electro-optic modulation is performed on the first signal in a double sideband electro-optic modulation manner. The subsequently generated first optical frequency comb signal is a double sideband optical frequency comb signal. The double sideband optical frequency comb signal includes more sideband orders and a wider frequency comb. The target signal generated based on the double sideband optical frequency comb signal has wider frequency distribution.

With reference to the third aspect, in a possible implementation, the system further includes a phase-locked loop. Both the output end of the modulator and the output end of the laser source are connected to an input end of the phase-locked loop. An output end of the phase-locked loop is connected to the input end of the laser source. The phase-locked loop is configured to calibrate a frequency and a phase of an output signal of the laser source.

For the system in this implementation, the frequency and the phase of the output signal of the laser source is calibrated by using the phase-locked loop, to stabilize the target signal and obtain the stable target signal.

With reference to the third aspect, in a possible implementation, the phase-locked loop is specifically configured to: calibrate the frequency and the phase of the output signal of the laser source based on the output signal in the $(N+1)^{th}$ time of electro-optic modulation, the first signal, and a preset tracked signal.

For the system in this implementation, the frequency and the phase of the output signal of the laser source are calibrated based on the output signal in the $(N+1)^{th}$ time of electro-optic modulation. In other words, each time after the system obtains the output signal in the electro-optic modulation, the phase-locked loop calibrates the frequency and the phase of the output signal of the laser source in time based on the output signal, so that the subsequently generated target signal is more stable.

With reference to the third aspect, in a possible implementation, the phase-locked loop is specifically configured to: perform third filtering processing on the output signal in the $(N+1)^{th}$ time of electro-optic modulation to generate an $(N+1)^{th}$ calibration spectral component, where a frequency of the $(N+1)^{th}$ calibration spectral component is different from a frequency of the first signal; generate an $(N+1)^{th}$ error signal based on the preset tracked signal and a signal generated based on a heterodyne beat frequency of the first signal and the (N+1)$^{th}$ calibration spectral component; and calibrate the frequency and the phase of the output signal of the laser source based on the (N+1)$^{th}$ error signal.

For the system in this implementation, a spectral component with a frequency different from the frequency of the first signal is obtained through filtering from the output signal in the (N+1)$^{th}$ time of electro-optic modulation. An error signal is obtained through frequency mixing and phase discrimination performed on the preset tracked signal and the signal generated based on the heterodyne beat frequency of the spectral component and the first signal. Subsequently, the frequency and the phase of the output signal of the laser source are calibrated by using the error signal, so that the frequency and the phase of the first signal output by the laser source reach a stable state, to achieve a purpose of stabilizing the target signal.

To resolve a problem of generating a high-frequency terahertz wave signal, this application provides a signal generating method, apparatus, and system. In this method, cyclic electro-optic modulation is performed on the first signal output by the laser source to obtain the first optical frequency comb signal. The first optical frequency comb signal includes the target spectral component whose frequency is equal to the sum of or the difference between the frequency of the first signal and the frequency of the target signal. Then, after filtering is performed on the first optical frequency comb signal, the target spectral component is obtained. Finally, the target signal is obtained based on the heterodyne beat frequency of the first signal and the target spectral component. Cyclic electro-optic modulation is performed on the first signal. The first optical frequency comb signal including the target spectral component with relatively high power may be obtained. Further, the target spectral component with the relatively high power may be obtained through filtering. A terahertz wave signal with a relatively high frequency may be obtained based on the heterodyne beat frequency of the first signal and the target spectral component.

DESCRIPTION OF EMBODIMENTS

The following describes technical solutions of this application with reference to accompanying drawings.

In the descriptions of this application, unless otherwise stated, "/" means "or". For example, A/B may indicate A or B. The term "and/or" in this specification describes only an association relationship for describing associated objects and represents that three relationships may exist. For example, A and/or B may represent the following three cases: Only A exists, both A and B exist, and only B exists. "At least one" means one or more, and "a plurality of" means two or more. Terms such as "first" and "second" do not limit a quantity and an execution sequence, and the terms such as "first" and "second" do not indicate a definite difference.

It should be noted that, in embodiments of this application, the term such as "example" or "for example" is used to represent giving an example, an illustration, or descriptions. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

To facilitate understanding of the technical solutions of this application, the following describes an example of an application scenario of the technical solutions provided in this application.

With reference to the background, it can be learned that a technology of generating a millimeter wave or a terahertz wave is a research hotspot in wireless communication research. A terahertz wave has a frequency band from 0.1 THz to 10 THz. Because the terahertz wave has high resolution, a short operating wavelength, and abundant spectrum resources, a technology of generating the terahertz wave widely interests the people.

A conventional technology of generating a millimeter wave or a terahertz wave is a signal generating technology based on an electrical method. In this technology, complexity and costs of the system are relatively high. In comparison, in a signal generating technology based on an optical heterodyning method, the system has a simple structure and relatively low costs. In addition, generated signals have a relatively large frequency range.

Figure 1:
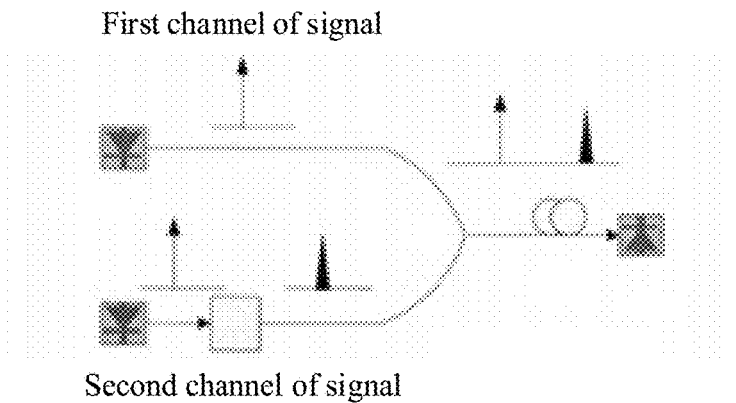
FIG. 1 is a schematic diagram of a signal generating method.

Specifically, refer to FIG. 1 for a specific implementation of generating a millimeter wave signal or a terahertz wave signal by using the optical heterodyning method. As shown in FIG. 1, two channels of optical wave signals between which a frequency interval is a frequency of a target terahertz wave signal or a frequency of a target millimeter wave signal are separately transmitted, that is, a first channel of signal and a second channel of signal are separately transmitted. A difference between a frequency of the first channel of signal and a frequency of the second channel of signal is the frequency of the target terahertz wave signal or the frequency of the target millimeter wave signal. The second channel of signal carries information to be transmitted. Then, the two channels of signals are coupled at a base station, and a heterodyne beat frequency is obtained to generate the target terahertz wave signal or the target millimeter wave signal. The heterodyne beat frequency indicates coherent superposition of two columns of optical wave signals with different frequencies in an optical instrument with a nonlinear feature to generate a beat signal. For example, the optical instrument may be a photoelectric detector. The photoelectric detector has an electric field square rate feature. The electric field square rate feature is a nonlinear feature. The photoelectric detector may also be referred to as a photoelectric converter or a photodetector.

However, a laser source outputting an optical wave signal is easily affected by a temperature drift factor. As a result, a frequency of a generated target millimeter wave signal or a target terahertz wave signal is unstable, and is prone to random fluctuation. In the conventional technologies, a plurality of technologies of improving an optical heterodyning method are proposed.

For example, an optical frequency comb signal is generated in an optical modulation manner. Then, a millimeter wave signal is generated based on a heterodyne beat frequency of an optical frequency comb signal and the optical wave signal output by the laser source. However, due to an impact of performance of a modulator, a frequency of the millimeter wave signal generated based on the heterodyne beat frequency is relatively low. A signal whose frequency is greater than 200 GHz or even up to 300 GHz cannot be generated.

For another example, a microwave-optical signal conversion apparatus is used to generate an optical frequency comb signal whose frequency interval is a frequency of a microwave signal. An optical frequency component is obtained through filtering from the optical frequency comb signal through optical up-conversion and phase compensation. After phase detection, an optical fiber link disturbance for the optical frequency component is obtained. The optical fiber link disturbance is fed back to a phase modulator that controls optical up-conversion and phase compensation. Then, a broadband receive apparatus is used to obtain the millimeter wave signal with a stable phase based on the heterodyne beat frequency of two optical signals in the optical frequency comb signal. Due to a limitation of performance of the phase modulator, it is difficult to obtain a terahertz wave signal with a frequency greater than 300 GHz.

On this basis, how to generate a terahertz wave signal with a relatively high frequency becomes an urgent technical problem to be resolved. In this application, the terahertz wave signal with the relatively high frequency may be a terahertz wave signal with a frequency greater than 200 GHz, or the terahertz wave signal with the relatively high frequency may be a terahertz wave signal with a frequency greater than 300 GHz.

The following describes in detail an embodiment of a signal generating method provided in this application.

Figure 2:
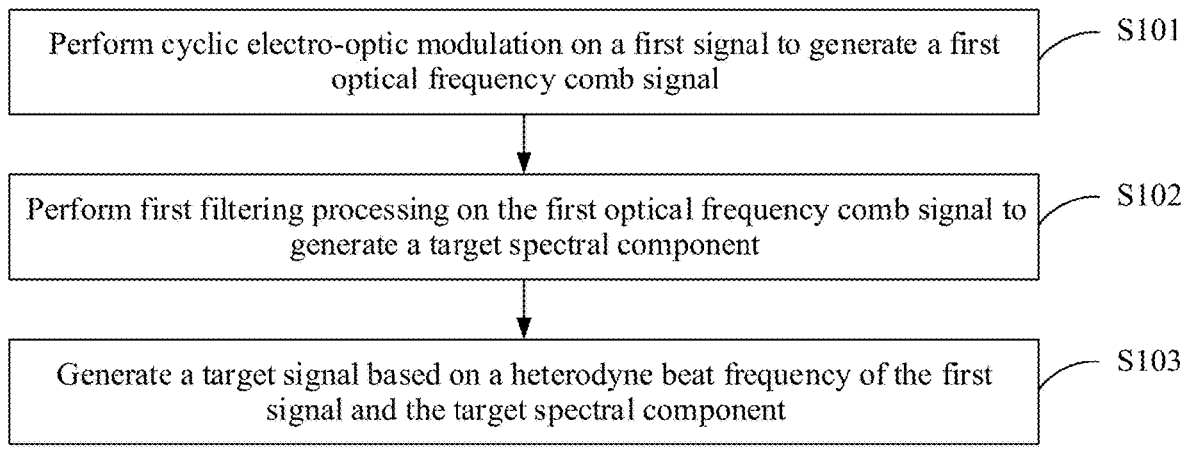
FIG. 2 is a schematic flowchart of an implementation of a signal generating method according to this application.

FIG. 2 is a schematic flowchart of an implementation of a signal generating method according to this application. The signal generating method may include the following steps.

Step S101: Perform cyclic electro-optic modulation on a first signal to generate a first optical frequency comb signal.

The first signal is a signal output by a laser source. The first optical frequency comb signal includes a target spectral component. A frequency of the target spectral component is equal to a sum of or a difference between a frequency of the first signal and a frequency of a target signal. The target signal is a signal that actually needs to be generated, and may be a terahertz wave signal with a relatively high frequency, for example, a terahertz wave signal with a frequency greater than or equal to 300 GHz; or may be a signal with another frequency, for example, a millimeter wave signal with a frequency less than 300 GHz. This is not limited in this application.

Optionally, performing cyclic electro-optic modulation on the first signal may be implemented in the following manner: performing electro-optic modulation on the first signal to generate an output signal in a first time of electro-optic modulation; then, performing electro-optic modulation on the first signal and the output signal in the first time of electro-optic modulation to generate an output signal in a second time of electro-optic modulation; performing electro-optic modulation on the first signal and the output signal in the second time of electro-optic modulation to generate an output signal in a third time of electro-optic modulation; performing electro-optic modulation on the first signal and the output signal in the third time of electro-optic modulation to generate an output signal in a fourth time of electro-optic modulation; and by analogy, after an output signal in an $N^{th}$ time of electro-optic modulation is obtained, performing electro-optic modulation on the first signal and the output signal in the $N^{th}$ time of electro-optic modulation to generate an output signal in an $(N-1)^{th}$ time of electro-optic modulation. In this way, electro-optic modulation is performed on the first signal and the output signal in the $N^{th}$ time of electro-optic modulation to generate the output signal in the $(N+1)^{th}$ time of electro-optic modulation. Cyclic electro-optic modulation is implemented for the first signal to obtain the optical frequency comb signal with a relatively large bandwidth, relatively uniform power distribution, and a relatively high edge sideband signal-to-noise ratio. Subsequently, the target spectral component with relatively high power that can be used to generate a terahertz wave signal with a relatively high frequency based on a beat frequency may be obtained based on the optical frequency comb signal.

Herein, N is an integer greater than or equal to 0. When N is equal to 0, electro-optic modulation is performed on the first signal and the output signal in the $N^{th}$ time of electro-optic modulation. Generating the output signal in the $(N+1)^{th}$ time of electro-optic modulation is performing electro-optic modulation on the first signal to generate the output signal in the first time of electro-optic modulation.

In a process of performing cyclic electro-optic modulation on the first signal, after electro-optic modulation is performed on the first signal, the output signal generated in the first electro-optic modulation is a second optical frequency comb signal. The second optical frequency comb signal includes a first spectral component. A frequency of the first spectral component is equal to a sum of or a difference between the frequency of the first signal and the frequency of the target signal. Performing electro-optic modulation on the first signal and the output signal in the first time of electro-optic modulation is performing electro-optic modulation on the first signal and the second optical frequency comb signal. An output signal generated in a second time of electro-optic modulation is a third optical frequency comb signal. The third optical frequency comb signal includes a second spectral component. A frequency of the second spectral component is equal to a sum of or a difference between the frequency of the first signal and the frequency of the target signal. In addition, a signal-to-noise ratio of the second spectral component is greater than a signal-to-noise ratio of the first spectral component. Performing electro-optic modulation on the first signal and the output signal in the second time of electro-optic modulation is performing electro-optic modulation on the first signal and the third optical frequency comb signal. An output signal generated in a third time of electro-optic modulation is a fourth optical frequency comb signal. The fourth optical frequency comb signal includes a third spectral component. A frequency of the third spectral component is equal to a sum of or a difference between the frequency of the first signal and the frequency of the target signal. A signal-to-noise ratio of the third spectral component is greater than the signal-to-noise ratio of the second spectral component. By analogy, after the output signal in the $N^{th}$ time of electro-optic modulation is obtained, the output signal in the $N^{th}$ time of electro-optic modulation is an $(N+1)^{th}$ optical frequency comb signal. The $(N+1)^{th}$ optical frequency comb signal includes an $N^{th}$ spectral component. A frequency of the $N^{th}$ spectral component is equal to the sum of or the difference between the frequency of the first signal and the frequency of the target signal. Performing electro-optic modulation on the first signal and the output signal in the $N^{th}$ time of electro-optic modulation is performing electro-optic modulation on the first signal and the $(N+1)^{th}$ optical frequency comb signal. The output signal generated in the $(N+1)^{th}$ time of electro-optic modulation is an $(N+2)^{th}$ optical frequency comb signal. The $(N+2)^{th}$ optical frequency comb signal includes an $(N+1)^{th}$ spectral component. A frequency of the $(N+1)^{th}$ spectral component is equal to the sum of or the difference between the frequency of the first signal and the frequency of the target signal. A signal-to-to-noise ratio of the $(N+1)^{th}$ spectral component is greater than a signal-to-to-noise ratio of the $N^{th}$ spectral component.

Likewise, when N is equal to 0, performing electro-optic modulation on the first signal and the output signal in the $N^{th}$ time of electro-optic modulation is performing electro-optic modulation on the first signal to generate the output signal in the $(N+1)^{th}$ time of electro-optic modulation as the second optical frequency comb signal.

The first optical frequency comb signal may be an optical frequency comb signal generated in any time of electro-optic modulation. In other words, the first optical frequency comb signal may be any one of the second optical frequency comb signal to the $(N+2)^{th}$ optical frequency comb signal. When a requirement for accuracy of a last generated target signal is relatively low, the first optical frequency comb signal may be an optical frequency comb signal generated before the second optical frequency comb signal, the third optical frequency comb signal, the fourth optical frequency comb signal, or the like. When a requirement for accuracy of a last generated target signal is relatively high, the first optical frequency comb signal may be an optical frequency comb signal generated after the $N^{th}$ optical frequency comb signal, the $(N+1)^{th}$ optical frequency comb signal, the $(N+2)^{th}$ optical frequency comb signal, or the like. Alternatively, the first optical frequency comb signal may be an optical frequency comb signal generated in each time of electro-optic modulation.

In a process of performing cyclic electro-optic modulation on the first signal to generate the first optical frequency comb signal, a manner of performing electro-optical modulation on the first signal and the output signal in the $N^{th}$ time of electro-optic modulation to generate the output signal in the $(N+1)^{th}$ time of electro-optic modulation may include a plurality of implementations. For example, Performing electro-optic modulation on the first signal and the output signal in the $N^{th}$ time of electro-optic modulation to generate the output signal in the $(N+1)^{th}$ time of electro-optic modulation may be implemented in the following manner:

In a possible implementation, single sideband electro-optic modulation is performed on the first signal and the output signal in the $N^{th}$ time of electro-optic modulation to generate the output signal in the $(N+1)^{th}$ time of electro-optic modulation. In this implementation, the correspondingly generated first optical frequency comb signal is a single sideband optical frequency comb signal. The single sideband optical frequency comb signal has a relatively large bandwidth, relatively uniform power distribution, and a relatively high edge sideband signal-to-noise ratio; and may include the target spectral component with the relatively high power. Subsequently, the target spectral component is used for the heterodyne beat frequency, to generate the target signal with the relatively high frequency.

In a possible implementation, double sideband electro-optic modulation is performed on the first signal and the output signal in the $N^{th}$ time of electro-optic modulation to generate an $(N+1)^{th}$ double sideband modulation signal; and second filtering processing is performed on the $(N+1)^{th}$ double sideband modulation signal to generate the output signal in the $(N+1)^{th}$ time of electro-optic modulation. The generated output signal in the $(N+1)^{th}$ time of electro-optic modulation is a single sideband optical frequency comb signal.

The second filtering processing is filtering one sideband of the $(N+1)^{th}$ double sideband modulation signal to obtain a single sideband optical frequency comb signal. For example, the $(N+1)^{th}$ double sideband modulation signal may include frequency components with frequencies $F_0$, $F_0 \pm F_1$, $F_0 \pm 2F_1$, ..., and $F_0 \pm MF_1$. Herein, $F_0$ and $F_1$ represent frequency values, and M is a positive integer. After the second filtering processing is performed on the $(N+1)^{th}$ double sideband modulation signal, the single sideband optical frequency comb signal is obtained. The single sideband optical frequency comb signal may include spectral components with frequencies $F_0$, $F_0+F_1$, $F_0+2F_1$, ..., and $F_0+MF_1$, or the single sideband optical frequency comb signal may further include spectral components with frequencies $F_0$, $F_0-F_1$, $F_0-2F_1$, ..., and $F_0-MF_1$.

In this implementation, the correspondingly generated first optical frequency comb signal is also a single sideband optical frequency comb signal. Likewise, the single sideband optical frequency comb signal has a relatively large bandwidth, relatively uniform power distribution, and a relatively high edge sideband signal-to-noise ratio; and may include the target spectral component with the relatively high power. Subsequently, the target spectral component is used for the heterodyne beat frequency, to generate the target signal with the relatively high frequency.

In a possible implementation, double sideband electro-optic modulation is performed on the first signal and the output signal in the $N^{th}$ time of electro-optic modulation to generate the output signal in the $(N+1)^{th}$ time of electro-optic modulation. In this implementation, the correspondingly generated first optical frequency comb signal is a double sideband optical frequency comb signal. In comparison with a case in which the first optical frequency comb signal is a single sideband optical frequency signal, the double sideband optical frequency comb signal includes more sideband orders and a wider frequency comb. The target signal generated based on the double sideband optical frequency comb signal has wider frequency distribution.

In a possible implementation, single sideband electro-optic modulation is performed on the first signal and the output signal in the $N^{th}$ time of electro-optic modulation to generate an $(N+1)^{th}$ single sideband modulation signal; and power amplification processing is performed on the $(N+1)^{th}$ single sideband modulation signal to generate the output signal in the $(N+1)^{th}$ time of electro-optic modulation. In this implementation, a power loss in a cyclic electro-optic modulation process may be compensated, to ensure that the target spectral component included in the generated first optical frequency comb signal has relatively high power and ensure that a target signal with relatively high power is generated.

In a possible implementation, single sideband electro-optic modulation is performed on the first signal and the output signal in the $N^{th}$ time of electro-optic modulation to generate an $(N+1)^{th}$ single sideband modulation signal; and a polarization state of the $(N+1)^{th}$ single sideband modulation signal is adjusted to generate the output signal in the $(N+1)^{th}$ time of electro-optic modulation. In this implementation, a polarization state of an optical wave signal in a cyclic electro-optic modulation process may be adjusted, to ensure that the target spectral component included in the generated first optical frequency comb signal has relatively high power and ensure that a target signal with relatively high power is generated.

In a possible implementation, single sideband electro-optic modulation is performed on the first signal and the output signal in the $N^{th}$ time of electro-optic modulation to generate an $(N+1)^{th}$ single sideband modulation signal; and power amplification processing is performed on the $(N+1)^{th}$ single sideband modulation signal to generate the $(N+1)^{th}$ single sideband modulation signal after power amplification. The polarization state of the $(N+1)^{th}$ single sideband modulation signal after power amplification is adjusted to generate the output signal in the $(N+1)^{th}$ time of electro-optic modulation. In this implementation, a power loss in the cyclic electro-optic modulation process may be compensated. A polarization state of an optical wave signal in the cyclic electro-optic modulation process may be adjusted, to ensure that the target spectral component included in the generated first optical frequency comb signal has relatively high power and ensure that a target signal with relatively high power is generated.

In a possible implementation, single sideband electro-optic modulation is performed on the first signal and the output signal in the $N^{th}$ time of electro-optic modulation to generate an $(N+1)^{th}$ single sideband modulation signal; and a polarization state of the $(N+1)^{th}$ single sideband modulation signal is adjusted to generate an $(N+1)^{th}$ single sideband modulation signal after adjustment of the polarization state. The power amplification processing is performed on the $(N+1)^{th}$ single sideband modulation signal after adjustment of the polarization state to generate the output signal in the $(N+1)^{th}$ time of electro-optic modulation. In this implementation, a power loss in the cyclic electro-optic modulation process may be compensated. A polarization state of an optical wave signal in the cyclic electro-optic modulation process may be adjusted, to ensure that the target spectral component included in the generated first optical frequency comb signal has relatively high power and ensure that a target signal with relatively high power is generated.

It should be noted that in a process of performing double sideband electro-optic modulation on the first signal and the output signal in the $N^{th}$ time of electro-optic modulation to generate the output signal in the $(N+1)^{th}$ time of electro-optic modulation, before the output signal in the $(N+1)^{th}$ time of electro-optic modulation is generated, power amplification processing may be first performed on an optical wave signal generated in an intermediate process and/or a polarization state of an optical wave signal generated in an intermediate process may be adjusted. For details, refer to content in the foregoing embodiment. Details are not described herein again.

Likewise, in a process of performing double sideband electro-optic modulation on the first signal and the output signal in the $N^{th}$ time of electro-optic modulation to generate the $(N+1)^{th}$ double sideband modulation signal, and performing second filtering processing on the $(N+1)^{th}$ double sideband modulation signal to generate the output signal in the $(N+1)^{th}$ time of electro-optic modulation, before the output signal in the $(N+1)^{th}$ time of electro-optic modulation is generated, power amplification processing may be first performed on an optical wave signal generated in an intermediate process and/or a polarization state of an optical wave signal generated in an intermediate process may be adjusted. For details, refer to content in the foregoing embodiment. Details are not described herein again.

In addition, in a process of performing double sideband electro-optic modulation on the first signal and the output signal in the $N^{th}$ time of electro-optic modulation to generate the $(N+1)^{th}$ double sideband modulation signal, and performing second filtering processing on the $(N+1)^{th}$ double sideband modulation signal to generate the output signal in the $(N+1)^{th}$ time of electro-optic modulation, after the $(N+1)^{th}$ double sideband modulation signal is generated, power amplification processing may be first performed on the $(N+1)^{th}$ double sideband modulation signal, second filtering processing may be then performed on the signal after the power amplification processing, and a polarization state of the signal obtained after the second filtering processing is adjusted to generate the output signal in the $(N+1)^{th}$ time of electro-optic modulation. In addition, a sequence of the power amplification processing, the second filtering processing, and adjustment processing of the polarization state may be further adjusted. This is not limited in this application.

Step S102: Perform first filtering processing on the first optical frequency comb signal to generate the target spectral component.

The first filtering processing is performed on the first optical frequency comb signal to obtain, through filtering, the target spectral component included in the first optical frequency comb signal.

The first filtering processing is to obtain, through filtering, the target spectral component from a plurality of spectral components included in the first optical frequency comb signal. For example, the first optical frequency comb signal may include spectral components with frequencies $F_0$, $F_0+F_1$, $F_0+2F_1$, ..., and $F_0+MF_1$. Herein, $F_0$ and $F_1$ both represent frequency values, and M is a positive integer. It is assumed that a frequency of the target spectral component is $F_0+MF_1$. After first filtering processing is performed on the first optical frequency comb signal, the target spectral component with a frequency of $F_0+MF_1$ may be obtained.

Step S103: Generate a target signal based on a heterodyne beat frequency of the first signal and the target spectral component.

In a possible implementation, after the first signal and the target spectral component are obtained, the target signal may be directly generated based on the heterodyne beat frequency of the first signal and the target spectral component.

In a possible implementation, after the first signal is obtained, power attenuation processing and/or phase adjustment processing may be first performed on the first signal, so that the first signal is in a stable state to obtain a stable first signal. Then, the target signal is generated based on the heterodyne beat frequency of the stable first signal and the target spectral component. In this implementation, the stable first signal may be obtained, to achieve a purpose of stabilizing the target signal.

In a possible implementation, after the stable first signal is coupled to the target spectral component, power amplification processing may be first performed on the coupled signal, and then the polarization state of the signal obtained after power amplification processing may be adjusted. Finally, the target signal is generated based on the heterodyne beat frequency of the first signal and the target spectral component after adjustment of the polarization state. In this implementation, when the target signal is stabilized, it may be further ensured that a target signal with a relatively high frequency is obtained, to obtain the stable target signal with the relatively high frequency.

In a possible implementation, after the stable first signal is coupled to the target spectral component, the polarization state of the coupled signal may be first adjusted, and power amplification processing may be performed on the signal obtained after adjustment of the polarization state. Finally, the target signal is generated based on the heterodyne beat frequency of the first signal and the target spectral component after power amplification processing. In this implementation, when the target signal is stabilized, it may be further ensured that a target signal with a relatively high frequency is obtained, to obtain the stable target signal with the relatively high frequency.

In some possible embodiments of this application, before the target signal is generated based on the heterodyne beat frequency of the first signal and the target spectral component, a frequency and a phase of an output signal of a laser source are further calibrated, so that the frequency and the phase of the first signal each time output by the laser source remain stable, to further achieve a purpose of stabilizing the target signal and obtain the stable target signal.

In a possible implementation, calibrating the frequency and the phase of the output signal of the laser source may be implemented in the following manner: calibrating the frequency and the phase of the output signal of the laser source based on the output signal in the $(N-1)^{th}$ time of electro-optic modulation, the first signal, and a preset tracked signal. A radio frequency (RF) signal with low phase noise, high stability, and a relatively small frequency offset, for example, a frequency offset at a level less than a parts per million (ppm) level may be selected as the preset tracked signal.

In this implementation, the frequency and the phase of the output signal of the laser source may be calibrated based on the output signal in the $(N+1)^{th}$ time of electro-optic modulation. In other words, each time after the output signal in the electro-optic modulation is obtained, the frequency and the phase of the output signal of the laser source are calibrated in time based on the output signal, so that the subsequently generated target signal is more stable.

In a possible implementation, calibrating the frequency and the phase of the output signal of the laser source based on the output signal in the $(N+1)^{th}$ time of electro-optic modulation, the first signal, and the preset tracked signal may be implemented in the following manner: performing third filtering processing on the output signal in the $(N+1)^{th}$ electro-optic modulation to generate an $(N+1)^{th}$ calibration spectral component, where a frequency of the $(N+1)^{th}$ calibration spectral component is different from the frequency of the first signal; generating an $(N+1)^{th}$ error signal based on the preset tracked signal and the signal generated based on the heterodyne beat frequency of the first signal and the $(N+1)^{th}$ calibration spectral component; and calibrating the frequency and the phase of the output signal of the laser source based on the $(N+1)^{th}$ error signal. After the frequency and the phase of the output signal of the laser source are calibrated in this implementation, the laser source may output an optical wave signal with a stable frequency and a stable phase. In other words, the frequency and the phase of the first signal reach a stable state to achieve a purpose of stabilizing the target signal.

The third filtering processing is obtaining, through filtering, a spectral component with a frequency different from the frequency of the first signal from the plurality of spectral components included in the output signal in the $(N+1)^{th}$ time of electro-optic modulation. The spectral component obtained through filtering is the $(N+1)^{th}$ calibration spectral component. For example, the frequency of the first signal is $F_0$. The output signal in the $(N+1)^{th}$ time of electro-optic modulation may include spectral components with frequencies $F_0$, $F_0+F_1$, $F_0+2F_1$, . . . , and $F_0+MF_1$. Herein, F1 represents a frequency value, and M is a positive integer. After third filtering processing is performed on the output signal in the $(N+1)^{th}$ time of electro-optic modulation, a spectral component with a frequency $F_0+F_1$ may be obtained, and the spectral component is the $(N+1)^{th}$ calibration spectral component.

After the frequency and the phase of the output signal of the laser source are calibrated, the stable target signal may be obtained through analyzing a spectrum graph of the target signal. Specifically, the first optical frequency comb signal may be an optical frequency comb signal generated in each time of electro-optic modulation. After the optical frequency comb signal is generated in each time of electro-optic modulation, the target signal is correspondingly generated based on the optical frequency comb signal, and then the spectrum graph of the target signal is obtained. Whether the target signal is a stable target signal is analyzed based on the spectrum graph. Generally, when the target signal is unstable, frequency stability of the target signal presented in the spectrum graph is not high, and spectrum purity is relatively low. When the target signal is relatively stable, frequency stability of the target signal presented in the spectrum graph is relatively high, spectrum purity is relatively high, and phase noise is relatively low.

In the signal generating method provided in this embodiment of this application, cyclic electro-optic modulation is performed on the first signal output by the laser source to obtain the first optical frequency comb signal. The first optical frequency comb signal includes the target spectral component whose frequency is equal to the sum of or the difference between the frequency of the first signal and the frequency of the target signal. Then, after filtering is performed on the first optical frequency comb signal, the target spectral component is obtained. Finally, the target signal is obtained based on the heterodyne beat frequency of the first signal and the target spectral component. Cyclic electro-optic modulation is performed on the first signal. The first optical frequency comb signal including the target spectral component with relatively high power may be obtained. Further, the target spectral component with the relatively high power may be obtained through filtering. A terahertz wave signal with a relatively high frequency may be obtained based on the heterodyne beat frequency of the first signal and the target spectral component. Further, in this method, the target signal may be stabilized through calibrating the frequency and the phase of the output signal of the laser source, to obtain a stable terahertz wave signal with a relatively high frequency.

The method embodiments described in this specification may be independent solutions, or may be combined based on internal logic. These solutions all fall within the protection scope of this application.

The solutions provided in embodiments of this application are mainly described above from a perspective of association between the modules. It may be understood that, to implement the foregoing functions, the modules include a corresponding hardware structure, software module, or a combination thereof for performing corresponding functions. Persons of ordinary skill in the art should easily be aware that, in combination with the examples described in embodiments disclosed in this specification, units, methods steps may be implemented by hardware or a combination of hardware and computer software. Whether a function is performed by hardware or hardware driven by computer software depends on a particular application and a design constraint of the technical solutions. Persons skilled in the art may use different methods to implement the described functions for each particular application, but it should not be considered that the implementation goes beyond the scope of this application.

In this embodiment of this application, function module division may be performed based on the foregoing method examples. For example, division into various function modules may be performed based on various corresponding functions, or two or more functions may be integrated into one processing module. The integrated module may be implemented in a form of hardware, or may be implemented in a form of a software function module. It should be noted that, in embodiments of this application, division into the modules is an example and is merely logical function division, and may be other division in an actual implementation. The following is described by using an example in which each function module is obtained through division based on each corresponding function.

The methods provided in embodiments of this application are described above in detail with reference to FIG. 1 and FIG. 2. The apparatus and the system provided in embodiments of this application are described below in detail with reference to FIG. 3 to FIG. 5. It should be understood that descriptions of the apparatus embodiment and the system embodiment correspond to the descriptions of the method embodiment. Therefore, for content that is not described in detail, refer to the foregoing method embodiment. For brevity, details are not described herein again.

Figure 3A:
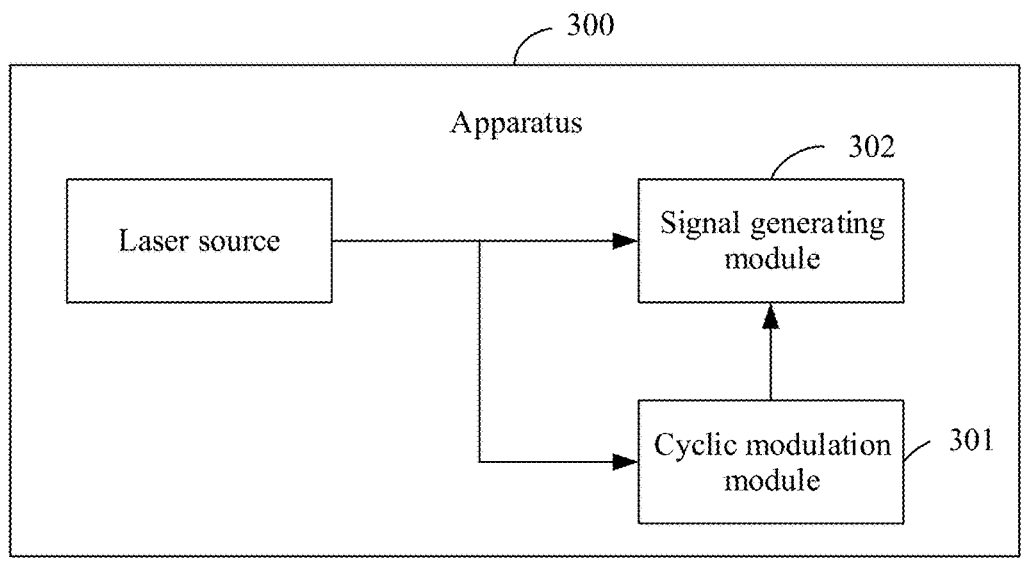
FIG. 3A is a block diagram of a structure of an implementation of a signal generating apparatus according to this application.

FIG. 3A is a block diagram of a structure of an implementation of a signal generating apparatus according to this application. As shown in FIG. 3A, the apparatus 300 may include: a cyclic modulation module 301 and a signal generating module 302. The apparatus 300 may be configured to perform actions in the foregoing method embodiments.

For example, the cyclic modulation module 301 may be configured to perform cyclic electro-optic modulation on a first signal to generate a first optical frequency comb signal. The first signal is a signal output by a laser source. The first optical frequency comb signal includes a target spectral component. A frequency of the target spectral component is equal to a sum of or a difference between a frequency of the first signal and a frequency of a target signal.

The signal generating module 302 may be configured to: perform first filtering processing on the first optical frequency comb signal to generate the target spectral component; and generate the target signal based on the heterodyne beat frequency of the first signal and the target spectral component.

In a possible implementation, the cyclic modulation module 301 is specifically configured to: perform electro-optic modulation on the first signal and an output signal in an $N^{th}$ time of electro-optic modulation to generate an output signal in an $(N+1)^{th}$ time of electro-optic modulation, where N is an integer greater than or equal to 0.

In a possible implementation, the cyclic modulation module 301 is specifically configured to: perform single sideband electro-optic modulation on the first signal and an output signal in an $N^{th}$ time of electro-optic modulation to generate an output signal in an $(N+1)^{th}$ time of electro-optic modulation.

In a possible implementation, the cyclic modulation module 301 is specifically configured to: perform double sideband electro-optic modulation on the first signal and the output signal in the $N^{th}$ time of electro-optic modulation to generate an $(N+1)^{th}$ double sideband modulation signal; and perform second filtering processing on the $(N+1)^{th}$ double sideband modulation signal to generate the output signal in the $(N+1)^{th}$ time of electro-optic modulation.

In a possible implementation, the cyclic modulation module 301 is specifically configured to: perform double sideband electro-optic modulation on the first signal and an output signal in an $N^{th}$ time of electro-optic modulation to generate an output signal in an $(N+1)^{th}$ time of electro-optic modulation.

Figure 3B:
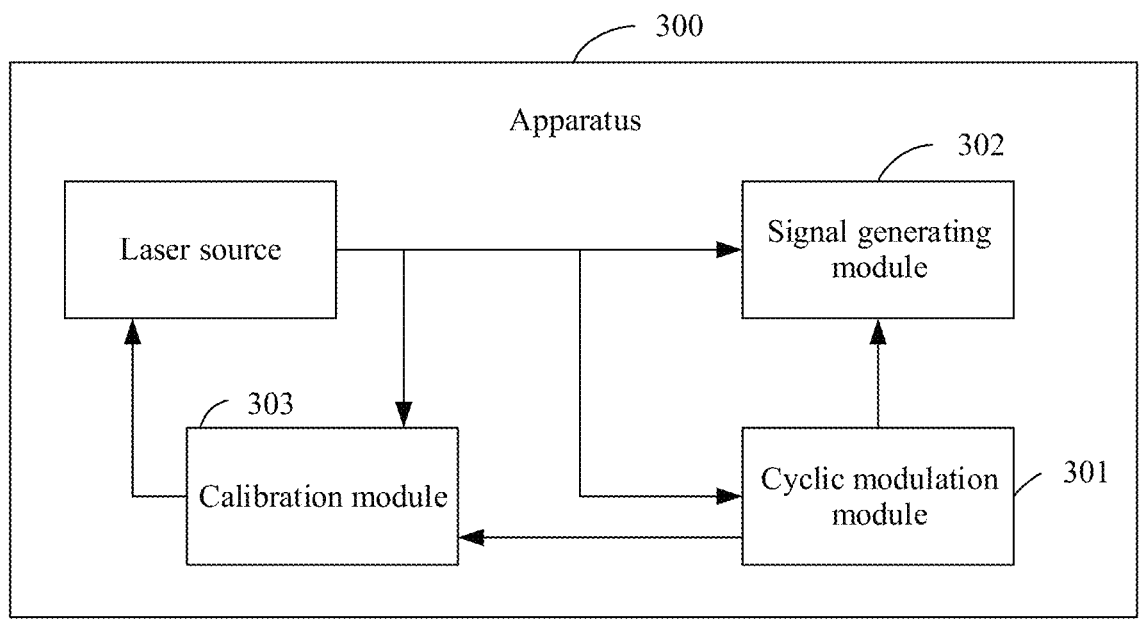
FIG. 3B is a block diagram of a structure of another implementation of a signal generating apparatus according to this application.

As shown in FIG. 3B, the apparatus 300 may further include a calibration module 303, configured to calibrate a frequency and a phase of an output signal of the laser source.

In a possible implementation, the calibration module 303 is specifically configured to: calibrate the frequency and the phase of the output signal of the laser source based on the output signal in the $(N+1)^{th}$ time of electro-optic modulation, the first signal, and a preset tracked signal.

In a possible implementation, the calibration module 303 is specifically configured to: perform third filtering processing on the output signal in the $(N+1)^{th}$ time of electro-optic modulation to generate an $(N+1)^{th}$ calibration spectral component, where a frequency of the $(N+1)^{th}$ calibration spectral component is different from the frequency of the first signal; generate an $(N+1)^{th}$ error signal based on the preset tracked signal and a signal generated based on a heterodyne beat frequency of the first signal and the $(N+1)^{th}$ calibration spectral component; and calibrate the frequency and the phase of the output signal of the laser source based on the $(N+1)^{th}$ error signal.

In other words, the apparatus 300 may implement steps or procedures corresponding to the method shown in FIG. 2 in this embodiment of this application. The apparatus 300 may include a module configured to execute the method shown in FIG. 2. The modules in the apparatus 300 and the foregoing other operations and/or functions are separately used to implement the corresponding steps of the method shown in FIG. 2. For example, the cyclic modulation module 301 in the apparatus 300 may be configured to perform step S101 in the method shown in FIG. 2, and the signal generating module 302 may be configured to perform step S102 and step S103 in the method shown in FIG. 2.

It should be understood that a specific process in which the units perform the foregoing corresponding steps has been described in detail in the foregoing method embodiments. For brevity, details are not described herein again.

Figure 4A:
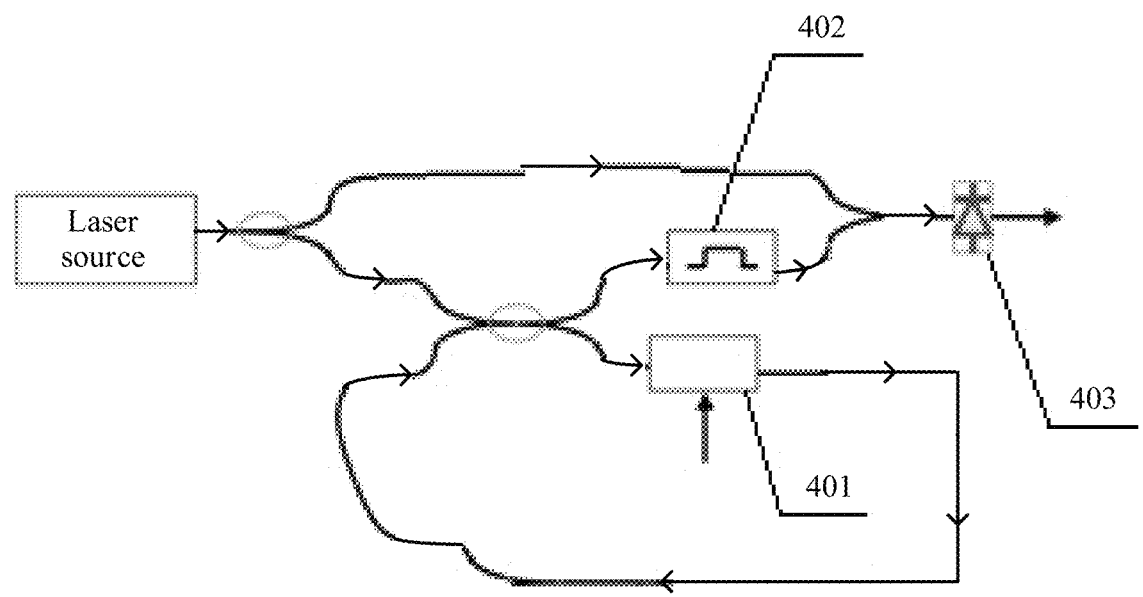
FIG. 4A is a schematic diagram of a structure of an implementation of a signal generating system according to this application.

FIG. 4A is a schematic diagram of a structure of an implementation of a signal generating system according to this application. As shown in FIG. 4A, the system may include a modulator 401, a filter 402, and a photoelectric detector 403.

An input end of the modulator 401 is connected to an output end of a laser source. An output end of the modulator 401 is connected to an input end of the filter 402. The input end of the modulator 401 is connected to the output end of the modulator 401. An output end of the filter 402 is connected to an input end of the photoelectric detector 403. The input end of the photoelectric detector 403 is further connected to the output end of the laser source.

The modulator 401 is configured to: receive a first signal output by the laser source, and perform cyclic electro-optic modulation on the first signal to generate a first optical frequency comb signal. The first optical frequency comb signal includes a target spectral component. A frequency of the target spectral component is equal to a sum of or a difference between a frequency of the first signal and a frequency of a target signal.

The filter 402 is configured to perform first filtering processing on the first optical frequency comb signal to generate the target spectral component.

The photoelectric detector 403 is configured to generate the target signal based on a heterodyne beat frequency of the first signal and the target spectral component.

In a possible implementation, the modulator 401 is specifically configured to: perform electro-optic modulation on the first signal and an output signal in an $N^{th}$ time of electro-optic modulation to generate an output signal in an $(N+1)^{th}$ time of electro-optic modulation, where N is an integer greater than or equal to 0.

In a possible implementation, the modulator 401 is specifically configured to: perform single sideband electro-optic modulation on the first signal and an output signal in an $N^{th}$ time of electro-optic modulation to generate an output signal in an $(N+1)^{th}$ time of electro-optic modulation.

In a possible implementation, the modulator 401 is specifically configured to: perform double sideband electro-optic modulation on the first signal and the output signal in the $N^{th}$ time of electro-optic modulation to generate an $(N+1)^{th}$ double sideband modulation signal; and perform second filtering processing on the $(N+1)^{th}$ double sideband modulation signal to generate the output signal in the $(N+1)^{th}$ time of electro-optic modulation.

In a possible implementation, the modulator 401 is specifically configured to: perform double sideband electro-optic modulation on the first signal and an output signal in an $N^{th}$ time of electro-optic modulation to generate an output signal in an $(N+1)^{th}$ time of electro-optic modulation.

Figure 4B:
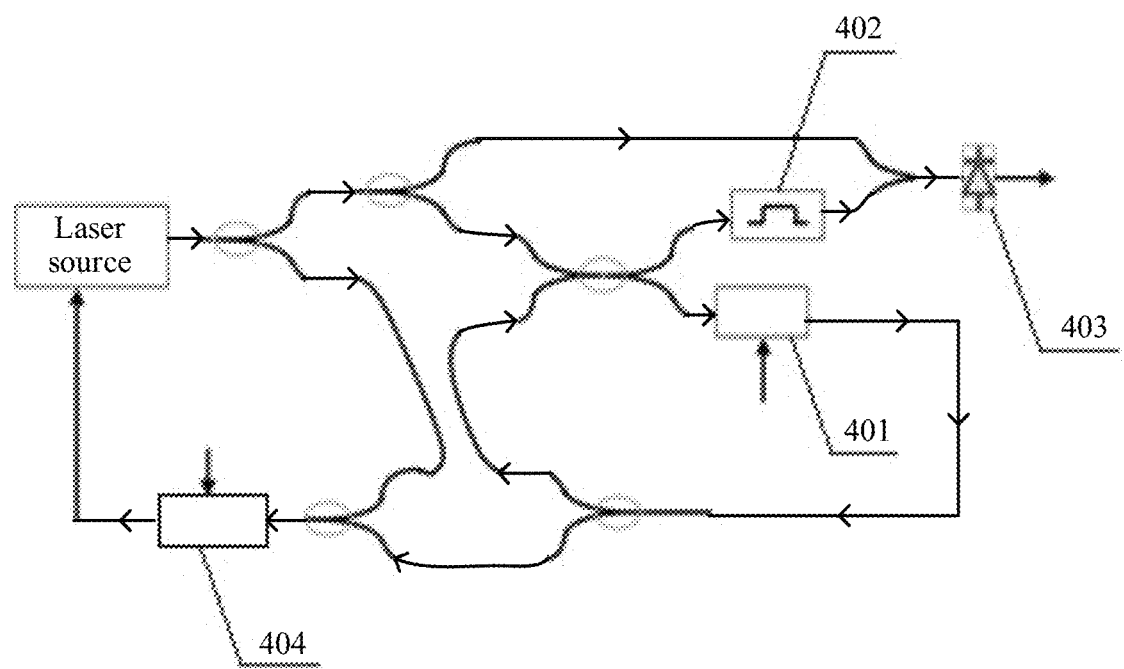
FIG. 4B is a schematic diagram of a structure of another implementation of a signal generating system according to this application.

As shown in FIG. 4B, the system may further include a phase-locked loop 404. Both the output end of the modulator 401 and the output end of the laser source are connected to an input end of the phase-locked loop 404. An output end of the phase-locked loop 404 is connected to the input end of the laser source. The phase-locked loop 404 is configured to calibrate the frequency and the phase of the output signal of the laser source.

Optionally, the phase-locked loop 404 is specifically configured to: calibrate the frequency and the phase of the output signal of the laser source based on the output signal in the $(N+1)^{th}$ time of electro-optic modulation, the first signal, and a preset tracked signal.

Optionally, the phase-locked loop 404 is specifically configured to: perform third filtering processing on the output signal in the $(N+1)^{th}$ time of electro-optic modulation to generate an $(N+1)^{th}$ calibration spectral component, where a frequency of the $(N+1)^{th}$ calibration spectral component is different from the frequency of the first signal; generate an $(N+1)^{th}$ error signal based on the preset tracked signal and a signal generated based on a heterodyne beat frequency of the first signal and the $(N+1)^{th}$ calibration spectral component; and calibrate the frequency and the phase of the output signal of the laser source based on the $(N+1)^{th}$ error signal.

The following uses a specific example to describe in detail a signal generating system of this application and a specific implementation process of generating a target signal by using the system.

Figure 5A:
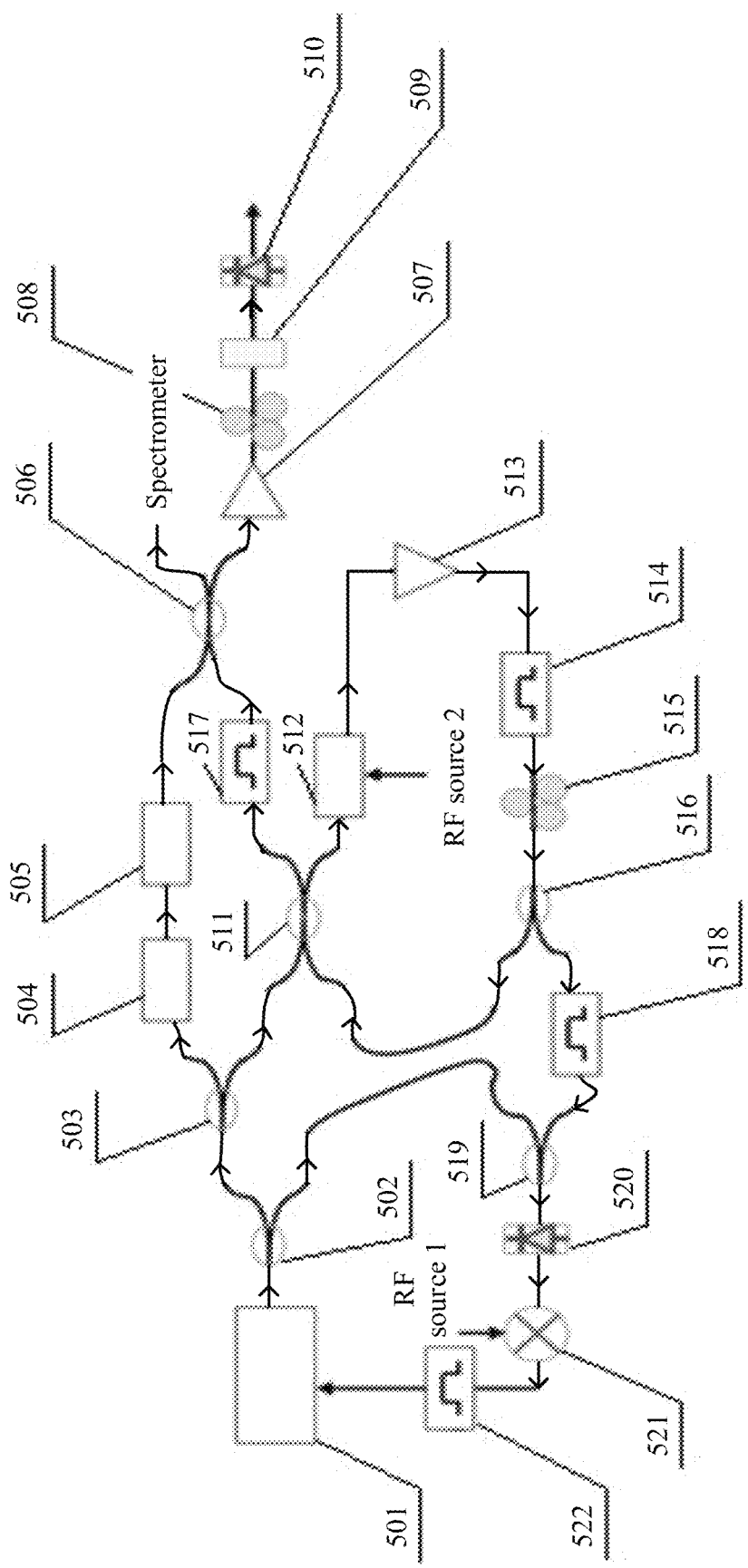
FIG. 5A is a schematic diagram of a structure of another implementation of a signal generating system according to this application.

FIG. 5A is a schematic diagram of a structure of another implementation of a signal generating system according to this application. The system may include: a laser source 501, a coupler 502, a coupler 503, an attenuator 504, a delay line 505, a coupler 506, an optical amplifier 507, a polarization controller 508, a polarizer 509, a photoelectric detector 510, a coupler 511, a modulator 512, an optical amplifier 513, an optical filter 514, a polarization controller 515, a coupler 516, an optical filter 517, an optical filter 518, a coupler 519, a photoelectric detector 520, an electrical mixer 521, and a low-pass filter 522. It should be noted that FIG. 5A is merely an example for describing a structure of the signal generating system in this application. The system is not limited to the parts shown in FIG. 5A, and may further add or delete some parts according to an actual requirement. This is not limited in this application.

An output end of the laser source 501 is connected to an input end of the coupler 502. An output end of the coupler 502 is separately connected to an input end of the coupler 503 and an input end of the coupler 519. An output end of the coupler 503 is separately connected to an input end of the attenuator 504 and an input end of the coupler 511. An output end of the attenuator 504 is connected to an input end of the delay line 505. An output end of the delay line 505 is connected to an input end of the coupler 506. An output end of the coupler 506 is connected to an input end of the optical amplifier 507. The output end of the coupler 506 may be further connected to a spectrometer. An output end of the optical amplifier 507 is connected to an input end of the polarization controller 508. An output end of the polarization controller 508 is connected to an input end of the polarizer 509. An output end of the polarizer 509 is connected to an input end of the photoelectric detector 510. An output end of the photoelectric detector 510 may output a target signal. An output end of the coupler 511 is separately connected to an input end of the modulator 512 and an input end of the optical filter 517. An output end of the optical filter 517 is connected to an input end of the coupler 506. An output end of the modulator 512 is connected to an input end of the optical amplifier 513. An output end of the optical amplifier 513 is connected to an input end of the optical filter 514. An output end of the optical filter 514 is connected to an input end of the polarization controller 515. An output end of the polarization controller 515 is connected to an input end of the coupler 516. An output end of the coupler 516 is separately connected to an input end of the coupler 511 and an input end of the optical filter 518. An output end of the optical filter 518 is connected to an input end of the coupler 519. An output end of the coupler 519 is connected to an input end of the photoelectric detector 520. An output end of the photoelectric detector 520 is connected to an input end of the electrical mixer 521. An output end of the electrical mixer 521 is connected to an input end of the low-pass filter 522. An output end of the low-pass filter 522 is connected to an input end of the laser source 501.

In all parts included in the system shown in FIG. 5A, the coupler 511, the modulator 512, the optical amplifier 513, the optical filter 514, the polarization controller 515, and the coupler 516 may constitute the cyclic modulation module 301 shown in FIG. 3A; the coupler 503, the attenuator 504, the delay line 505, the coupler 506, the optical amplifier 507, the polarization controller 508, the polarizer 509, the photoelectric detector 510, and the optical filter 517 may constitute the signal generating module 302 shown in FIG. 3A; and the coupler 502, the optical filter 518, the coupler 519, the photoelectric detector 520, the electrical mixer 521, and the low-pass filter 522 may constitute the calibration module 303 shown in FIG. 3B. For specific functions of each part in the system shown in FIG. 5A, refer to content of the following embodiments.

It should be noted that the coupler 502, the coupler 503, the coupler 516, and the coupler 519 may all be replaced with a splitter or a combiner, and the attenuator 504 may also be replaced with a variable gain amplifier. The photoelectric detector 510 and the photoelectric detector 520 may also be referred to as a photoelectric converter or a photodetector.

Figure 5B:
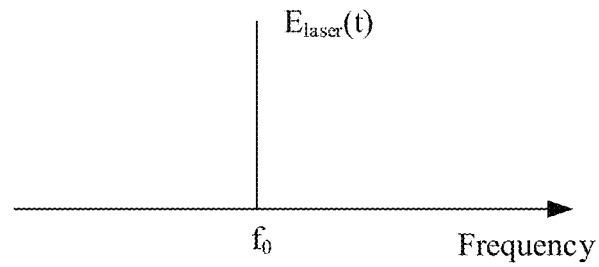
FIG. 5B to FIG. 5I are a schematic diagram of a frequency spectrum of an application scenario according to this application.

A specific implementation process of generating a target signal by using the system is as follows:

The laser source 501 periodically outputs a first signal. A spectrum graph of the first signal is shown in FIG. 5B. The first signal may be represented as follows:

$$E_{laser}(t)=E_0 \exp(j2\pi f_0+\phi_0(t))$$

Herein, $E_0$ is an amplitude of the first signal $E_{laser}(t)$, $f_0$ is a frequency of the first signal $E_{laser}(t)$, and $\phi_0(t)$ is a phase of the first signal $E_{laser}(t)$.

Figure 5C:
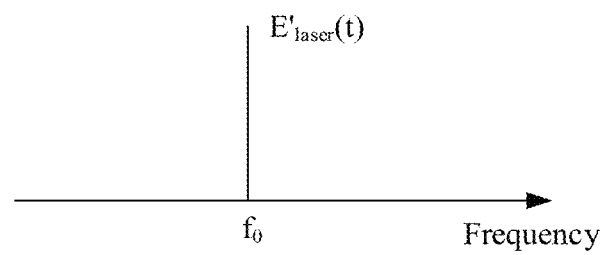

The first signal output by the laser source 501 is divided into two channels by using the coupler 502. One channel of the first signal output by the coupler 502 is further divided into two channels by using the coupler 503. One channel of the first signal output by the coupler 503 undergoes power attenuation processing of the attenuator 504 and phase adjustment processing of the delay line 505 to obtain the first signal after the power attenuation processing and the phase adjustment processing. The frequency of the first signal after the power attenuation processing and the phase adjustment processing remains unchanged. A spectrum graph of the signal is shown in FIG. 5C. The first signal after the power attenuation processing and the phase adjustment processing may be represented as follows:

$$E'_{laser}(t)=E_1 \exp(j2\pi f_0+\phi_1(t))$$

Herein, $E_1$ represents an amplitude of the first signal $E'_{laser}(t)$ after the power attenuation processing and the phase adjustment processing, and $\phi_1(t)$ represents a phase of the first signal $E'_{laser}(t)$ after the power attenuation processing and the phase adjustment processing. A frequency of the first signal $E'_{laser}(t)$ after the power attenuation processing and the phase adjustment processing is still $f_0$.

Figure 5D:
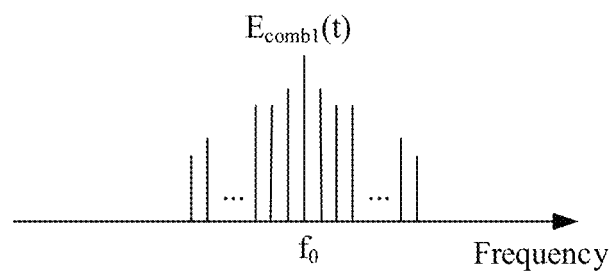

Another channel of the first signal output by the coupler 503 is input to the modulator 512 by using the coupler 511. The modulator 512 performs electro-optic modulation on the another channel of the first signal and a single sideband optical frequency comb signal that is generated in a previous time of electro-optic modulation and that is input by the coupler 511 to the modulator 512, to generate a double sideband optical frequency comb signal. A spectrum graph of the double sideband optical frequency comb signal is shown in FIG. 5D. The double sideband optical frequency comb signal may be represented as follows:

$$E_{comb1}(t)=E_0 \exp(j2\pi f_0+\phi_0(t))(C_0 \pm C_1\exp(j2\pi f_{LO2}t+\phi_{LO2}(t)\pm \ldots \pm C_i\exp(j2\pi f_{LO2}t+\phi_{LO2}(t)))$$

Herein, $C_i$ is an amplitude coefficient of a spectral component included in a double sideband optical frequency comb signal $E_{comb1}(t)$, $C_i$ is a constant, i represents a quantity of spectral components included in the double sideband optical frequency comb signal $E_{comb1}(t)$, $f_{LO2}$ represents a frequency of a modulation signal input to the modulator 512, and $\phi_{LO2}(t)$ represents a phase of the modulation signal.

Figure 5E:
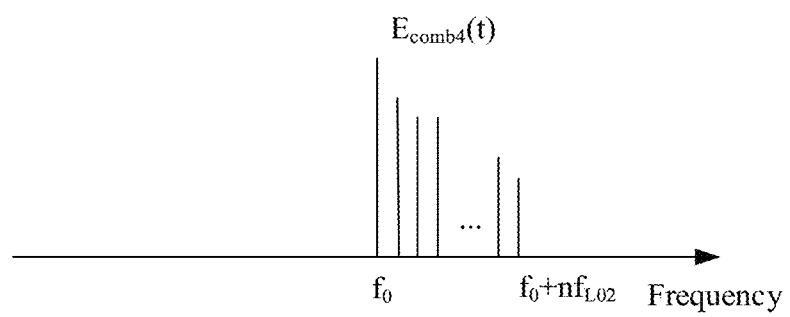

After power amplification processing is performed on the double sideband optical frequency comb signal $E_{comb1}(t)$ by the optical amplifier 513, a single sideband optical frequency comb signal is obtained through filtering by using the optical filter 514. The single sideband optical frequency comb signal includes a target spectral component. A spectrum graph of the single sideband optical frequency comb signal is shown in FIG. 5E. The single sideband optical frequency comb signal may be represented as follows:

$$E_{comb4}(t)=E_0 \exp(j2\pi f_0+\phi_0(t))(C_0+C_1\exp(j2\pi f_{LO2}t+\phi_{LO2}(t)+ \ldots +C_i\exp(j2\pi f_{LO2}t+\phi_{LO2}(t)))$$

Figure 5F:
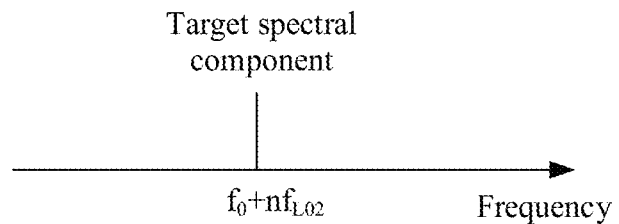
Figure 5G:
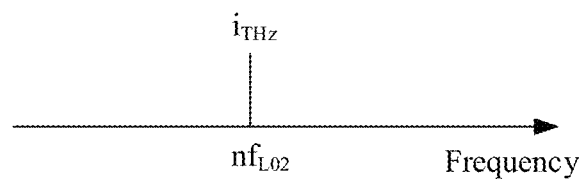

After a polarization state of the single sideband optical frequency comb signal $E_{comb4}(t)$ is adjusted by the polarization controller 515, the single sideband optical frequency comb signal $E_{comb4}(t)$ is separately input to the modulator 512 and the optical filter 517 by using the coupler 516 and the coupler 511. The single sideband optical frequency comb signal $E_{comb4}(t)$ input to the modulator 512 participates in a next electro-optic modulation process. Details are not described herein. The required target spectral component is obtained through filtering by using the optical filter 517 from the single sideband optical frequency comb signal $E_{comb4}(t)$ input to the optical filter 517. A spectrum graph of the target spectral component is shown in FIG. 5F.

For example, a target signal generated by using the system is a 400 GHz terahertz wave signal, and a frequency $f_{LO2}$ of a modulation signal (that is, a radio frequency signal input from a radio frequency RF source 2 shown in FIG. 5A) input to the modulator 512 is 20 GHz. A target spectral component obtained through filtering by using the filter 517 is 20 harmonic components from the frequency of the first signal, that is, the frequency of the target spectral component is equal to a difference between the frequency $f_0$ of the first signal and 20 times a frequency of the modulation signal: 20 $f_{LO2}$. The target spectral component may be represented as follows:

$$E_{comb2}(t) \propto E_2 \exp(j(2\pi(f_0+20f_{LO2})t+\phi_0(t)+20\phi_{LO2}(t))$$

Herein, $E_2$ is an amplitude of the target spectral component $E_{comb2}(t)$. A frequency of the target spectral component $E_{comb2}(t)$ is $f_0+20 f_{LO2}$.

The target spectral component $E_{comb2}(t)$ and the first signal $E'_{laser}(t)$ obtained after power attenuation processing and phase adjustment processing are combined in the coupler 506. A combined signal may be represented as follows:

$$Ecom \propto E_1 \exp(j2\pi f_0+\phi_1(t))E_2\exp(j(2\pi(f_0+20f_{LO2})t+\phi_0(t)+20\phi_{LO2}(t))$$

The combined signal Ecom successively undergoes power amplification processing of the optical amplifier 507, adjustment of a polarization state performed by the polarization controller 508 and the polarizer 509, and a heterodyne beat frequency in the photoelectric detector 510. Optical power of the photoelectric detector 510 may be represented as follows:

$$P(t) \propto E_1^2+E_2^2+E_1E_2(2\pi(f_0+20f_{LO2})t+(\phi_1(t)+\phi_0(t)+20\phi_{LO2}(t)))+\cos(2\pi(20f_{LO2})t+(\phi_1(t)-\phi_0(t)-20\phi_{LO2}(t)))$$

If a response of the photoelectric detector 510 is marked as Ro, an output current of the photoelectric detector 510 may be represented as follows:

$$i(t) \propto R_0(E_1^2+E_2^2+E_1E_2(2\pi(f_0+20f_{LO2})t+(\phi_1(t)+\phi_0(t)+20\phi_{LO2}(t)))+\cos(2\pi(20f_{LO2})t+(\phi_1(t)-\phi_0(t)-20\phi_{LO2}(t))))$$

Herein, $20f_{LO2}$ is a frequency of a target signal. It can be learned from an expression of an output current i(t) of the photoelectric detector 510 that, because the frequency $f_0$ of the first signal $E'_{laser}(t)$ that is input to the photoelectric detector 510 and that undergoes power attenuation processing and phase adjustment processing and the frequency $f_0+20 f_{LO2}$ of the target spectral component $E_{comb2}(t)$ are both relatively high, a sum of the two frequencies $f_0+f_0+20$ $f_{LO2}$ is also relatively high. Because this response does not exist physically, the photoelectric detector 510 cannot output a signal with a frequency of $f_0+f_0+20\ f_{LO2}$. A response to a difference 20 $f_{LO2}$ between the two frequencies is within a detection range of the photoelectric detector 510. After a direct-current component is ignored, final output of the photoelectric detector is the target signal, that is, the 400 GHz terahertz wave signal. A spectrum graph of the terahertz wave signal may be shown in FIG. 5G. For a frequency $nf_{LO2}$ of the terahertz wave signal shown in FIG. 5G, n is 20. When $f_{LO2}$ is 20 G, the terahertz wave signal is the 400 GHz terahertz wave signal. The 400 GHz terahertz wave signal may be represented as follows:

$$i_{THz} \propto R_0 E_1 E_2 \cos(40\pi f_{LO2}(t)+(\phi_1(t)-\phi_0(t)-20\phi_{LO2}(t)))$$

In addition, phase noise performance of the generated target signal $i_{THz}$ is related to phase noise of the first signal $E_{laser}(t)$ and phase noise of the modulation signal of the modulator 512. An association relationship may be represented as follows:

$$\phi_{THz} \propto \phi_1(t)-\phi_0(t)-20\phi_{LO2}(t)$$

Herein, $\phi_{THz}$ is a phase of the target signal $i_{THz}$.

Figure 5H:
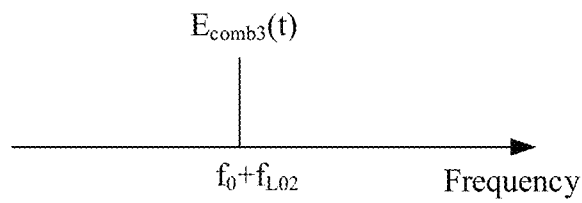

Therefore, the phase noise of the target signal $i_{THz}$ may be adjusted based on the first signal $E_{laser}(t)$ and the single sideband optical frequency comb signal $E_{comb4}(t)$ generated and modulated by the modulator 512. Specifically, the coupler 516 may further input, to the optical filter 518, the single sideband optical frequency comb signal $E_{comb4}(t)$ input to the coupler 516. A spectral component $E_{comb3}(t)$ at one frequency interval from the first signal is obtained through filtering by using the optical filter 518. A spectrum graph of the spectral component $E_{comb3}(t)$ is shown in FIG. 5H. The spectral component $E_{comb3}(t)$ may be represented as follows:

$$E_{comb3}(t) \propto \exp(j(2\pi(f_0+f_{LO2})t+\phi_0(t)+\phi_{LO2}(t))$$

It should be noted that the spectral component $E_{comb3}(t)$ shown in FIG. 5H is merely an example. Another spectral component with a frequency different from the frequency of the first signal may be further obtained through filtering by using the optical filter 518. For example, a spectral component with a frequency of $f_0+2f_{LO2}$, $f_0+3f_{LO2}$, $f_0+4f_{LO2}$, or the like may be obtained through filtering by using the optical filter 518.

Figure 5I:
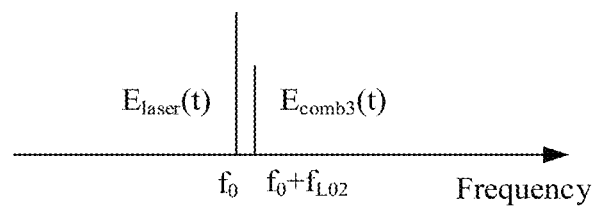

The spectral component $E_{comb3}(t)$ and another channel of the first signal output by the coupler 502 are combined in the coupler 519. A spectrum graph of the combined signal is shown in FIG. 5I The combined signal is input to the photoelectric detector 520. A radio frequency signal $i_{RF}$ is generated based on a heterodyne beat frequency of the combined signal in the photoelectric detector 520.

$$i_{RF} \propto \cos(2\pi f_{LO2}(t)+\phi_0(t)+\phi_{LO2}(t))$$

Phase noise performance of the radio frequency signal $i_{RF}$ is associated with phase noise of the first signal $E_{laser}(t)$ and phase noise of the modulation signal. The association relationship may be represented as $\phi_{RF} \propto \phi_0(t)+\phi_{LO2}(t)$. Therefore, the radio frequency signal $i_{RF}$ may be used to track a change of the target signal $i_{THz}$. The radio frequency signal $i_{RF}$ is stable, and the target signal $i_{THz}$ is stable.

On this basis, frequency mixing and phase discrimination are performed on the radio frequency signal iRF and a preset tracked signal (for example, a radio frequency signal input from a radio frequency RF source 1 shown in FIG. 5A) used as a reference radio frequency signal in the electrical mixer 521 to output an error signal. After filtering processing is performed on the error signal by using the low-pass filter 522, the processed signal is input to the laser source 501 to calibrate a phase and a frequency of an output signal of the laser source. In this way, the phase and the frequency of the output signal of the laser source are stabilized, and the phase and the frequency of the first signal are in a relatively stable state. Therefore, the phase and the frequency of the first signal do not fluctuate randomly to obtain a target signal with high stability.

It should be noted that the system shown in FIG. 5A is merely an example of a signal generating system provided in this application. In all the parts included in the system shown in FIG. 5A, the coupler 502, the coupler 503, the attenuator 504, the delay line 505, the coupler 506, the optical amplifier 507, the polarization controller 508, the polarizer 509, the coupler 511, the optical amplifier 513, the optical filter 514, the polarization controller 515, the coupler 516, the optical filter 518, the coupler 519, the photoelectric detector 520, the electrical mixer 521, and the low-pass filter 522 may be selected for use according to a requirement of an actual application scenario. In addition, another part may be added according to a requirement of an actual application scenario. This is not limited in this application.

It may be clearly understood by persons skilled in the art that, for the purpose of convenient and brief description, for a detailed working process of the foregoing system, apparatus, and module, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the modules is merely logical function division and may be other division in actual implementation. For example, a plurality of modules or components may be combined or integrated into another system, or some features may be ignored or not performed.

The signal generating apparatus and the signal generating system provided in embodiments of this application may be configured to perform the method provided above. Therefore, for beneficial effects that can be achieved, refer to the beneficial effects of the method provided above. Details are not described herein again.

It should be understood that a sequence of executing the steps in various embodiments of this application should be determined according to functions and internal logic of the steps. Sequence numbers of the steps do not indicate an execution sequence. This does not limit an implementation process of embodiments.

Embodiments in this specification are all described in a progressive manner, for same or similar parts in embodiments, refer to these embodiments, and each embodiment focuses on a difference from other embodiments. Especially, embodiments of the signal generating apparatus and the signal generating system are basically similar to the method embodiment, and therefore are described briefly. For related parts, refer to descriptions in the method embodiment.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

The foregoing implementations of this application are not intended to limit the protection scope of this application.

What is claimed is:

1. A signal generating method, wherein the method comprises:

performing cyclic electro-optic modulation on a first signal to generate a first optical frequency comb signal, wherein the first signal is a signal output by a laser source, the first optical frequency comb signal comprises a target spectral component, and a frequency of the target spectral component is equal to a sum of or a difference between a frequency of the first signal and a frequency of a target signal;

performing first filtering processing on the first optical frequency comb signal to generate the target spectral component; and generating the target signal based on a heterodyne beat frequency of the first signal and the target spectral component.

2. The signal generating method according to claim 1, wherein the performing cyclic electro-optic modulation on a first signal comprises:

performing electro-optic modulation on the first signal and an output signal in an $N^{th}$ time of electro-optic modulation to generate an output signal in an $(N+1)^{th}$ time of electro-optic modulation, wherein N is an integer greater than or equal to 0.

3. The signal generating method according to claim 2, wherein the performing electro-optic modulation on the first signal and an output signal in an $N^{th}$ time of electro-optic modulation to generate an output signal in an $(N+1)^{th}$ time of electro-optic modulation comprises:

performing single sideband electro-optic modulation on the first signal and the output signal in the $N^{th}$ time of electro-optic modulation to generate the output signal in the $(N+1)^{th}$ time of electro-optic modulation.

4. The signal generating method according to claim 2, wherein the performing electro-optic modulation on the first signal and an output signal in an $N^{th}$ time of electro-optic modulation to generate an output signal in an $(N+1)^{th}$ time of electro-optic modulation comprises:

performing double sideband electro-optic modulation on the first signal and the output signal in the $N^{th}$ time of electro-optic modulation to generate an $(N+1)^{th}$ double sideband modulation signal; and performing second filtering processing on the $(N+1)^{th}$ double sideband modulation signal to generate the output signal in the $(N+1)^{th}$ time of electro-optic modulation.

5. The signal generating method according to claim 2, wherein the performing electro-optic modulation on the first signal and an output signal in an $N^{th}$ time of electro-optic modulation to generate an output signal in an $(N+1)^{th}$ time of electro-optic modulation comprises:

performing double sideband electro-optic modulation on the first signal and the output signal in the $N^{th}$ time of electro-optic modulation to generate the output signal in the $(N+1)^{th}$ time of electro-optic modulation.

6. The signal generating method according to claim 2, wherein the method further comprises: calibrating a frequency and a phase of an output signal of the laser source.

7. The signal generating method according to claim 6, wherein the calibrating a frequency and a phase of an output signal of the laser source comprises:

calibrating the frequency and the phase of the output signal of the laser source based on the output signal in the $(N+1)^{th}$ time of electro-optic modulation, the first signal, and a preset tracked signal.

8. The signal generating method according to claim 7, wherein the calibrating the frequency and the phase of the output signal of the laser source based on the output signal in the $(N+1)^{th}$ time of electro-optic modulation, the first signal, and a preset tracked signal comprises:

performing third filtering processing on the output signal in the $(N+1)^{th}$ time of electro-optic modulation to generate an $(N+1)^{th}$ calibration spectral component, wherein a frequency of the $(N+1)^{th}$ calibration spectral component is different from the frequency of the first signal;

generating an $(N+1)^{th}$ error signal based on the preset tracked signal and a signal generated based on a heterodyne beat frequency of the first signal and the $(N+1)^{th}$ calibration spectral component; and calibrating the frequency and the phase of the output signal of the laser source based on the $(N+1)^{th}$ error signal.

9. A signal generating apparatus, wherein the apparatus comprises:

a cyclic modulation circuit, configured to perform cyclic electro-optic modulation on a first signal to generate a first optical frequency comb signal, wherein the first signal is a signal output by a laser source, the first optical frequency comb signal comprises a target spectral component, and a frequency of the target spectral component is equal to a sum of or a difference between a frequency of the first signal and a frequency of a target signal; and a signal generating circuit, configured to: perform first filtering processing on the first optical frequency comb signal to generate the target spectral component, and generate the target signal based on a heterodyne beat frequency of the first signal and the target spectral component.

10. The signal generating apparatus according to claim 9, wherein the cyclic modulation circuit is configured to:

perform electro-optic modulation on the first signal and an output signal in an $N^{th}$ time of electro-optic modulation to generate an output signal in an $(N+1)^{th}$ time of electro-optic modulation, wherein N is an integer greater than or equal to 0.

11. The signal generating apparatus according to claim 10, wherein the cyclic modulation circuit is configured to: perform single sideband electro-optic modulation on the first signal and an output signal in an $N^{th}$ time of electro-optic modulation to generate an output signal in an $(N+1)^{th}$ time of electro-optic modulation.

12. The signal generating apparatus according to claim 10, wherein the cyclic modulation circuit is configured to:

perform double sideband electro-optic modulation on the first signal and the output signal in the $N^{th}$ time of electro-optic modulation to generate an $(N+1)^{th}$ double sideband modulation signal; and perform second filtering processing on the $(N+1)^{th}$ double sideband modulation signal to generate the output signal in the $(N+1)^{th}$ time of electro-optic modulation.

13. The signal generating apparatus according to claim 10, wherein the cyclic modulation circuit is configured to: perform double sideband electro-optic modulation on the first signal and an output signal in an $N^{th}$ time of electro-optic modulation to generate an output signal in an $(N+1)^{th}$ time of electro-optic modulation.

14. The signal generating apparatus according to claim 10, wherein the apparatus further comprises:

a calibration circuit, configured to calibrate a frequency and a phase of an output signal of the laser source.

15. The signal generating apparatus according to claim 14, wherein the calibration circuit is configured to:
    calibrate the frequency and the phase of the output signal of the laser source based on the output signal in the $(N+1)^{th}$ time of electro-optic modulation, the first signal, and a preset tracked signal.

16. The signal generating apparatus according to claim 15, wherein the calibration circuit is configured to:
    perform third filtering processing on the output signal in the $(N+1)^{th}$ time of electro-optic modulation to generate an $(N+1)^{th}$ calibration spectral component, wherein a frequency of the $(N+1)^{th}$ calibration spectral component is different from the frequency of the first signal;
    generate an $(N+1)^{th}$ error signal based on the preset tracked signal and a signal generated based on a heterodyne beat frequency of the first signal and the $(N+1)^{th}$ calibration spectral component; and
    calibrate the frequency and the phase of the output signal of the laser source based on the $(N+1)^{th}$ error signal.

17. A signal generating system, wherein the system comprises a modulator, a filter, and a photoelectric detector;
    an input end of the modulator is connected to an output end of a laser source, an output end of the modulator is connected to an input end of the filter, the input end of the modulator is connected to the output end of the modulator, and an output end of the filter is connected to an input end of the photoelectric detector;
    the modulator is configured to: receive a first signal output by the laser source, and perform cyclic electro-optic modulation on the first signal to generate a first optical frequency comb signal, the first optical frequency comb signal comprises a target spectral component, and a frequency of the target spectral component is equal to a sum of or a difference between a frequency of the first signal and a frequency of a target signal;
    the filter is configured to perform first filtering processing on the first optical frequency comb signal to generate the target spectral component; and
    the photoelectric detector is configured to generate the target signal based on a heterodyne beat frequency of the first signal and the target spectral component.

18. The signal generating system according to claim 17, wherein the modulator is configured to:
    perform electro-optic modulation on the first signal and an output signal in an $N^{th}$ time of electro-optic modulation to generate an output signal in an $(N+1)^{th}$ time of electro-optic modulation, wherein N is an integer greater than or equal to 0.

19. The signal generating system according to claim 18, wherein the modulator is configured to:
    perform single sideband electro-optic modulation on the first signal and an output signal in an $N^{th}$ time of electro-optic modulation to generate an output signal in an $(N+1)^{th}$ time of electro-optic modulation.

20. The signal generating system according to claim 18, wherein the modulator is configured to:
    perform double sideband electro-optic modulation on the first signal and the output signal in the $N^{th}$ time of electro-optic modulation to generate an $(N+1)^{th}$ double sideband modulation signal; and
    perform second filtering processing on the $(N+1)^{th}$ double sideband modulation signal to generate the output signal in the $(N+1)^{th}$ time of electro-optic modulation.

* * * * *